(12) United States Patent
Symes et al.

(10) Patent No.: US 12,547,330 B2
(45) Date of Patent: Feb. 10, 2026

(54) STORAGE USAGE

(71) Applicant: Arm Limited, Cambridge (GB)

(72) Inventors: Dominic Hugo Symes, Cambridge (GB); Jens Olson, San Jose, CA (US); Elliot Maurice Simon Rosemarine, London (GB); Ian Rudolf Bratt, Portola Valley, CA (US); Jared Corey Smolens, Santa Clara, CA (US); Rajanarayana Priyanka Marigi, Lund (SE); Fredrik Peter Stolt, Lund (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/778,203

(22) Filed: Jul. 19, 2024

(65) Prior Publication Data
US 2026/0023489 A1    Jan. 22, 2026

(51) Int. Cl.
G06F 3/00    (2006.01)
G06F 3/06    (2006.01)

(52) U.S. Cl.
CPC .......... *G06F 3/0631* (2013.01); *G06F 3/0604* (2013.01); *G06F 3/0632* (2013.01); *G06F 3/0673* (2013.01)

(58) Field of Classification Search
None
See application file for complete search history.

(56) References Cited

U.S. PATENT DOCUMENTS 5,768,594 A    6/1998 Blelloch et al.
2015/0128151 A1    5/2015 Rak et al.
2016/0335134 A1    11/2016 Gupta et al.
2019/0340010 A1    11/2019 Lee et al.
2020/0004460 A1*    1/2020 Gould .................. G06F 3/0613
(Continued)

FOREIGN PATENT DOCUMENTS

GB    2626388 A    7/2024
KR    102480287 B1    12/2022

OTHER PUBLICATIONS

Hsu Kuan-Chieh et al: "Accelerating Applications using Edge Tensor Processing Units", Nov. 14, 2021.
(Continued)

*Primary Examiner* — Midys Rojas
(74) *Attorney, Agent, or Firm* — EIP US LLP

(57) ABSTRACT

A processor comprising storage, execution circuitry and a handling unit configured to obtain task data that describes a task to be executed, comprising a plurality of operations representable as a directed graph of operations. The plurality of operations comprises: a set of production operations comprising generating a set of blocks comprising an intermediate block generated by a production operation in determining a final block; and a consumption operation. The handling unit generates a set of location data indicative of respective physical storage locations allocated to store respective blocks, traverses the set of location data to obtain location data indicative of a physical storage location for storing the intermediate block, and generates and sends execution instructions to instruct the execution circuitry to execute at least part of the consumption operation to read the intermediate block from the physical storage location, the execution instructions comprising the location data.

20 Claims, 12 Drawing Sheets

(56) References Cited

U.S. PATENT DOCUMENTS

| | | |
|---|---|---|
| 2020/0036790 A1* | 1/2020 | Lv ..................... G06F 16/1824 |
| 2021/0132945 A1 | 5/2021 | Mills |
| 2021/0294960 A1 | 9/2021 | Wu et al. |
| 2022/0244984 A1 | 8/2022 | Lee et al. |
| 2023/0008622 A1 | 1/2023 | Boyd et al. |
| 2024/0127392 A1 | 4/2024 | Hughes et al. |
| 2024/0231937 A1 | 7/2024 | Chawla et al. |

OTHER PUBLICATIONS

Taslynow Anuar et al: Tensor Yard: One-Shot Algorithm of Hardware-Friendly Tensor-Train Decomposition for Convolutional Neural Networks, Aug. 9, 2021.

"Flashattention: Fast and memory-efficient exact attention with io-awareness." Dao, Tri, et al., Advances in Neural Information Processing Systems 35 (2022): 16344-16359.

International Search Report and Written Opinion dated Oct. 13, 2025 for PCT Application No. PCT/GB2025/051608.

* cited by examiner

| Per buffer controls | | | | | | | |
|---|---|---|---|---|---|---|---|
| Buf num | Allocated | Free | Valid C0 (intermed) | Valid C1 (completed) | Sub-pipe | Next buf (completed) | Next buf (intermed) |
| Buffer3 | 0 | 1 | 0 | 0 | null | null | null |
| Buffer2 | 0 | 1 | 0 | 0 | null | null | null |
| Buffer1 | 0 | 1 | 0 | 0 | null | null | null |
| Buffer0 | 0 | 1 | 0 | 0 | null | null | null |

| Per buffer controls | | | | | | | |
|---|---|---|---|---|---|---|---|
| Buf num | Allocated | Free | Valid C0 (intermed) | Valid C1 (completed) | Sub-pipe | Next buf (complEted) | Next buf (intermed) |
| Buffer3 | 0 | 1 | 0 | 0 | null | null | null |
| Buffer2 | 0 | 1 | 0 | 0 | null | null | null |
| Buffer1 | 0 | 1 | 0 | 0 | null | null | null |
| Buffer0 | 1 | 0 | 0 | 0 | null | null | null |

| Per buffer controls | | | | | | | |
|---|---|---|---|---|---|---|---|
| Buf num | Allocated | Free | Valid C0 (intermed) | Valid C1 (completed) | Sub-pipe | Next buf (completed) | Next buf (intermed) |
| Buffer3 | 0 | 1 | 0 | 0 | null | null | null |
| Buffer2 | 0 | 1 | 0 | 0 | null | null | null |
| Buffer1 | 0 | 1 | 0 | 0 | null | null | null |
| Buffer0 | 1 | 0 | 1 | 0 | null | null | null |

| Per buffer controls | | | | | | | |
|---|---|---|---|---|---|---|---|
| Buf num | Allocated | Free | Valid C0 (intermed) | Valid C1 (completed) | Sub-pipe | Next buf (completed) | Next buf (intermed) |
| Buffer3 | 0 | 1 | 0 | 0 | null | null | null |
| Buffer2 | 0 | 1 | 0 | 0 | null | null | null |
| Buffer1 | 1 | 0 | 0 | 0 | 0 | null | null |
| Buffer0 | 1 | 0 | 1 | 0 | 0 | null | 1 |

| Per buffer controls | | | | | | | |
|---|---|---|---|---|---|---|---|
| Buf num | Allocated | Free | Valid C0 (intermed) | Valid C1 (completed) | Sub-pipe | Next buf (completed) | Next buf (intermed) |
| Buffer3 | 0 | 1 | 0 | 0 | null | null | null |
| Buffer2 | 0 | 1 | 0 | 0 | null | null | null |
| Buffer1 | 1 | 0 | 1 | 0 | 0 | null | null |
| Buffer0 | 1 | 0 | 1 | 0 | 0 | null | 1 |

| Per buffer controls | | | | | | | |
|---|---|---|---|---|---|---|---|
| Buf num | Allocated | Free | Valid C0 (intermed) | Valid C1 (completed) | Sub-pipe | Next buf (completed) | Next buf (intermed) |
| Buffer3 | 0 | 1 | 0 | 0 | null | null | null |
| Buffer2 | 1 | 0 | 0 | 0 | 0 | null | null |
| Buffer1 | 1 | 0 | 1 | 0 | 0 | null | 2 |
| Buffer0 | 1 | 0 | 1 | 0 | 0 | null | 1 |

| Per buffer controls | | | | | | | |
|---|---|---|---|---|---|---|---|
| Buf num | Allocated | Free | Valid C0 (intermed) | Valid C1 (completed) | Sub-pipe | Next buf (completed) | Next buf (intermed) |
| Buffer3 | 0 | 1 | 0 | 0 | null | null | null |
| Buffer2 | 1 | 0 | 1 | 1 | 0 | null | null |
| Buffer1 | 1 | 0 | 1 | 0 | 0 | null | 2 |
| Buffer0 | 1 | 0 | 1 | 0 | 0 | null | 1 |

STORAGE USAGE

BACKGROUND

Technical Field

The disclosure herein relates to a processor.

Description of the Related Technology

An NPU (neural processing unit) is a specialized piece of hardware designed to optimize the performance of tasks related to artificial intelligence and neural networks. NPUs are increasingly common and are used for tasks such as autonomous driving and natural language processing, as well as face recognition, and voice recognition. NPUs typically include many processing elements and associated control structures that allow efficient processing of the numerous calculations in neural network and machine learning workloads.

GPUs (graphics processing units) were originally developed for rendering graphics in video games and multimedia applications. GPUs typically have hardware that is optimized for graphics processing tasks such as rendering graphics, simulating physics (e.g. ray tracing), and other tasks that require parallel processing. GPUs may also find applications in processing tasks relates to artificial intelligence and neural networks.

Data processing techniques, such as neural network processing and graphics processing, involve the processing and generation of considerable amounts of data. It is desirable to efficiently handle data such as this.

SUMMARY

According to a first aspect of the present disclosure, there is provided a processor comprising: storage; execution circuitry; and a handling unit configured to: obtain task data that describes a task to be executed, the task comprising a plurality of operations representable as a directed graph of operations, the plurality of operations comprising: a set of production operations comprising generating a set of blocks of data values, the set of blocks comprising an intermediate block of intermediate data values generated by a production operation of the set of production operations in determining a final block of final data values based on the intermediate block; and a set of consumption operations, each comprising reading of at least one of the set of blocks; and allocate respective physical storage locations of the storage for storing respective blocks of the set of blocks; generate a set of location data indicative of the respective physical storage locations; and instruct execution of at least part of a consumption operation of the set of consumption operations comprising reading of the intermediate block, comprising: traversing the set of location data to obtain location data of the set of location data indicative of a physical storage location of the physical storage locations for storing the intermediate block; generating execution instructions to instruct the execution circuitry to execute the at least part of the consumption operation to read the intermediate block from the physical storage location, the execution instructions comprising the location data; and sending the execution instructions to the execution circuitry.

BRIEF DESCRIPTION OF THE DRAWINGS

FIG. 9 is a schematic diagram of a linked list for tracking storage usage according to a yet further example;

FIGS. 10a to 10g are tables showing per buffer controls for tracking storage usage at different respective stages of executing an operation.

DETAILED DESCRIPTION

Figure 1A:
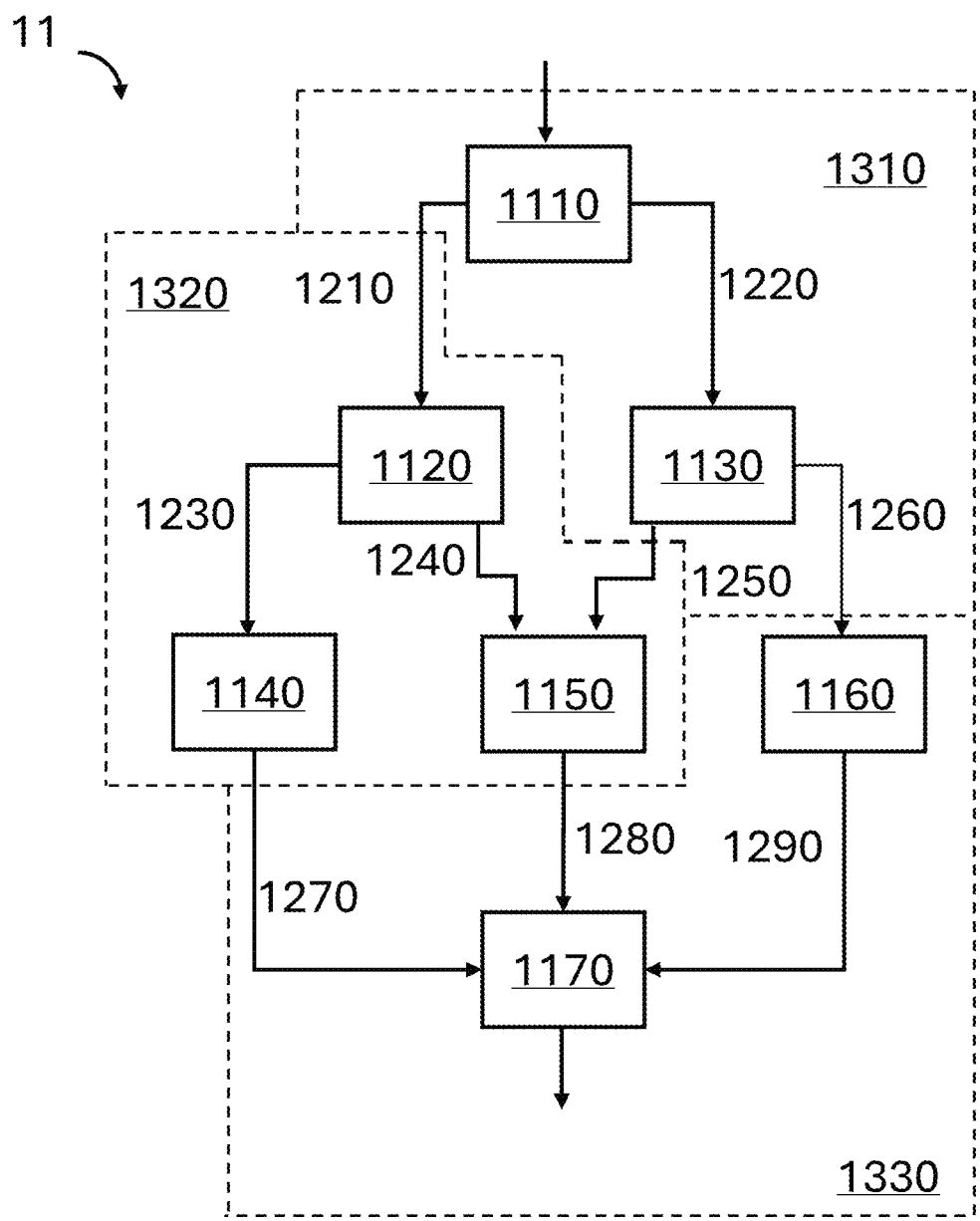
FIG. 1a illustrates an example directed graph.

Examples herein relate to a processor comprising storage, execution circuitry and a handling unit. The handling unit is configured to obtain task data that describes a task to be executed. The task comprises a plurality of operations representable as a directed graph of operations.

In examples, a consumption operation of the plurality of operations comprises reading of an intermediate block of intermediate data values generated by a production operation of the plurality of operations in determining a final block of final data values based on the intermediate block. The handling unit is configured to allocate a physical storage location of the storage for storing the intermediate block and to generate location data indicative of the physical storage location. The handling unit is further configured to generate execution instructions to instruct the execution circuitry to at least partly execute the production operation to generate the intermediate block and to store the intermediate block in the physical storage location, the execution instructions comprising the location data, and send the execution instructions to the execution circuitry.

The handling unit in these examples can appropriately allocate the physical storage location for storing the intermediate block to provide for increased flexibility in future operations to be performed on the intermediate block. For example, the handling unit may determine a physical storage location for the intermediate block in which the intermediate block can be maintained, rather than being overwritten by the final block (or a subsequently generated intermediate block). This may allow the intermediate block to be utilized by a consumption operation comprising reading the intermediate block.

In further examples, the plurality of operations comprise a set of production operations comprising generating a set of blocks of data values, the set of blocks comprising an intermediate block of intermediate data values generated by a production operation of the set of production operations in determining a final block of final data values based on the intermediate block, and a set of consumption operations, each comprising reading of at least one of the set of blocks. In these further examples, the handling unit is configured to allocate respective physical storage locations of the storage for storing respective blocks of the set of blocks and to generate a set of location data indicative of the respective physical storage locations. The handling unit is further configured to instruct execution of at least part of a consumption operation of the set of consumption operations comprising reading of the intermediate block. Instructing execution of the at least part of the consumption operation comprises traversing the set of location data to obtain location data of the set of location data indicative of a physical storage location of the physical storage locations for storing the intermediate block. Instructing execution of the at least part of the consumption operation further comprises generating execution instructions to instruct the execution circuitry to execute the at least part of the consumption operation to read the intermediate block from the physical storage location, the execution instructions comprising the location data, and sending the execution instructions to the execution circuitry.

In these further examples, the intermediate block may be read during a consumption operation that is different from the production operation in which the intermediate block is generated. For example, rather than limiting consumption of the intermediate block to the production operation that produced the intermediate block (e.g. to overwrite the intermediate block in the physical storage location by a successively generated intermediate block), these further examples permit the intermediate block to be read during the consumption operation, which is different from the production operation. This for example allows more complex tasks to be executed by the execution circuitry in an efficient manner.

Execution of a Directed Graph

Many data structures to be executed in a processor can be expressed as a directed graph. Examples of such data structures include neural networks which can be represented as a directed graph of operations that wholly compose the operations required to execute a network (i.e. to execute the operations performed across the layers of a neural network). A directed graph is a data structure of operations (which may be referred to herein as 'sections') having directed connections therebetween that indicate a flow of operations. The connections between operations (or sections) present in the graph of operations may be referred to as pipes (where a given connection is the sole tenant of a particular region of the storage unit, which region may be allocated to that connection statically or dynamically) or sub-pipes (where a given connection shares a particular region of the storage unit with at least one other connection). The allocation of particular storage elements within a given region of the storage unit to different respective sub-pipes that are tenants of the given region of the storage unit may be performed dynamically. A plurality of sub-pipes may belong to the same pipe as each other, which may be referred to as a multi-pipe. In such cases, the multi-pipe may be the sole tenant of the given region of the storage unit, which may itself be statically or dynamically allocated to the multi-pipe. A directed graph may contain any number of divergent and convergent branches. A directed graph may contain any number of divergent and convergent branches.

FIG. 1a illustrates an example directed graph 11 in which sections are interconnected by pipes or sub-pipes. Specifically, an initial section, section 1 (1110) represents a point in the directed graph at which an operation, operation A, is to be performed when executing the graph. The output of operation A at section 1, 1110, is connected to two further sections, section 2 (1120) and section 3 (1130) at which respective operations B and C are to be performed. The connection between section 1 (1110) and section 2 (1120) can be identified as a pipe with a unique identifier, pipe 1 (1210). The connection between section 1 (1110) and section 3 (1130) can be identified as a pipe with a different unique identifier, pipe 2 (1220). The output of section 1, which is the result of performing operation A on the input to section 1, can be provided to multiple subsequent sections in a branching manner.

More generally, sections in the directed graph may receive multiple inputs, each from a respective different section in the directed graph via a respective different pipe or sub-pipe. In FIG. 1a, sections 2 and 3 (1120, 1130) each write to different respective sub-pipes (1230, 1240, 1250, 1260) of the same pipe, pipe 3, which is a multi-pipe. Each sub-pipe has its own unique identifier, which also indicates the multi-pipe to which the sub-pipe belongs, where a multi-pipe is a pipe comprising at least one sub-pipe, as explained above. In this case, section 2 writes to sub-pipes 3.0 and 3.1 (1230, 1240) and section 3 writes to sub-pipes 3.2 and 3.3 (1250, 1260), where the numeral prior to the period indicates the identifier of the multi-pipe (3) and the numeral after the period indicates the identifier of the sub-pipe of the multi-pipe (0 to 3 in this case). A region of a storage unit is allocated to multi-pipe 3, and respective storage elements of the region of the storage unit are dynamically allocated to sub-pipes 3.0 to 3.3. In this example, different sections (sections 2 and 3) thus write to the same underlying physical region of the storage unit, via dynamically allocated sub-pipes.

The directed graph 11 of FIG. 1a also includes sections 4 to 6 (1140 to 1170) and pipes 4 to 6 (1270 to 1290). The sections 4 and 6 (1140, 1160) receive input data from sub-pipes 3.0 and 3.3 (1230, 1260) respectively, and write data to pipes 4 and 6 (1270, 1290) respectively. Section 5 (1150) in FIG. 1a receives a first set of input data via sub-pipe 3.1 (1240) from section 2 (1120) and a second set of input data via sub-pipe 3.2 (1250) from section 3 (1130) and writes data to pipe 5 (1280). Section 7 (1170) of the directed graph 11 receives input data from pipes 4 to 6 (1270 to 1290). Depending on the nature of the operation performed in a particular section and the dependencies of subsequent operations on the output of the operation, any number of input and output pipes may be connected to a particular section in the directed graph.

The directed graph can be represented by a number of sub-graphs each containing a subset of the sections in the graph. FIG. 1a illustrates an arrangement where the graph 11 is broken down into three sub-graphs 1310, 1320, and 1330 which can be connected together to form the complete graph. For example, sub-graph 1310 contains sections 1 and 3 (1110 and 1130) as well as pipe 2 and sub-pipe 3.3 (1220 and 1260)), sub-graph 1320 contains section 2, 4 and 5 (1120, 1140, and 1150) as well as pipe 1 and sub-pipes 3.0 to 3.2 (1210, 1230, 1240, and 1250), and sub-graph 1330 contains sections 6 and 7 (1160 and 1170) as well as pipes 4 to 6 (1270, 1280, and 1290).

The operations performed when executing a neural network can be broken down into a sequence of operations forming a directed graph in the form described in respect of FIG. 1a. Examples herein provide more flexibility in execution of a directed graph of operations such as that shown in FIG. 1a, and for example allow more complex operations to be executed efficiently.

Convolution Operations

When executing progressions of operations, for example structured in a directed graph, each section could represent a different operation. It is not necessary for each operation to be of the same type or nature. This is particularly the case where the graph of operations is used to represent the processing of a neural network. The machine learning software ecosystem allows for a diverse structure of neural networks that are applicable to many different problem spaces, and as such there is a very large possible set of operators from which a neural network can be composed.

It is desirable to define a set of pre-determined low-level operations from which a broad range of possible higher-level operations that correspond with various machine learning tool sets can be built. One example of such a low-level set of operations, is the Tensor Operator Set Architecture (TOSA). The Tensor Operator Set Architecture (TOSA) provides a set of whole-tensor operations commonly employed by Deep Neural Networks. The intent is to enable a variety of implementations running on a diverse range of processors, with the results at the TOSA level consistent across those implementations. Applications or frameworks which target TOSA can therefore be deployed on a wide range of different processors, including single-instruction multiple-data (SIMD) CPUs, graphics processing units (GPUs) and custom hardware such as neural processing units/tensor processing units (NPUs/TPUs), with defined accuracy and compatibility constraints. Most operators from the common ML frameworks (TensorFlow, PyTorch, etc.) should be expressible in TOSA.

Many of the operations in a defined operation set (such as TOSA) can be represented as a loop of scalar operations. For example, consider a 2D convolution operation which can be expressed as a multi-dimensional loop of scalar operations. These may need to be executed on 2D input data having dimensions input X (IX) and input Y (IY):

- (input) Input channel (IC)—a dimension representing the input channels upon which the operation is to be performed (in the example of images this may be three channels each representing one of red, green, and blue input channels)
- (input) Kernel dimension X (KX)—a first dimension X of a 2D kernel;
- (input) Kernel dimension Y (KY)—a second dimension Y of a 2D kernel;
- (output) Output X (OX)—a first dimension of the output feature map for the convolution operation;
- (output) Output Y (OY)—a second dimension of the output feature map for the convolution operation;
- (output) Batch (N)—a batch dimension of the operation, where the operation is to be batched;
- (output) Output channel (OC)—a dimension representing the output channels to be produced for the 2D convolution operation.

In one proposed ordering, KY/KX can be considered the inner-most dimensions and OC is the outer-most dimension.

For the 2D convolution operation example above, it is possible to express the operation to be performed as a "nested for-loop" of scalar operations as is illustrated in the pseudo-code set out below. In practice, when executing this operation, it is necessary for a processor to execute the operation across each of these dimensions by performing a multiple-accumulate operation (MAC), the result of which is then written into an accumulator (e.g. an accumulator buffer in hardware). Having operated through all of these dimensions, the 2D convolution is completed and the contents of the accumulator therefore represents the result of the 2D convolution operation across the entire dimensionality of operation.

```
for(output channel)
  for(batch N)
    for(output Y)
      for(output X)
        for(input channel)
          for(kernel Y)
            for(kernel X)
              MAC
              write accumulator
```

In examples herein, an operation (which may be a production operation or a consumption operation) may be a completed loop over a dimension of a nested for-loop. Completing a loop of a nested for-loop for example involves executing a plurality of instances of the loop (each of which may be considered a sub-operation of the operation) to generate a block of data values, in dependence on previous blocks generated in previous instances of the loop. In the example of the 2D convolution operation above, data generated at a respective instance of the loop (by a multiplication) is accumulated with data from at least one previous instance of the loop. The data generated upon completion of a loop may be a final block of data values as referred to in examples herein, and the data generated upon completion of an instance of a loop prior to the final instance may be an intermediate block of data values as referred to in examples herein. A final block may be referred to interchangeably as a completed block herein.

Operations such as the 2D convolution operation described above can be separated into operation blocks, each operation block representing a subset of an operation in which each dimension of the operation block covers a subset of the full range of the corresponding dimension in the operation. For example, the 2D convolution described above can be separated into multiple operation blocks by breaking up the operation in the OY, OX, and IC dimensions. In such cases, an operation may be a completed loop of a nested for-loop over the subset of the dimensions of the operation block, and a sub-operation may be an instance of the loop. In these cases, execution of the operation may generate a plurality of final blocks of data values, each corresponding to a different subset of the dimensions.

Hardware Implementation

As described above, a data structure in the form of a directed graph may comprise plural sequenced operations that are connected to one another for execution in a progression. Described below is an example hardware arrangement for executing linked operations for at least a portion of a directed graph as illustrated in FIG. 1a.

Figure 1B:
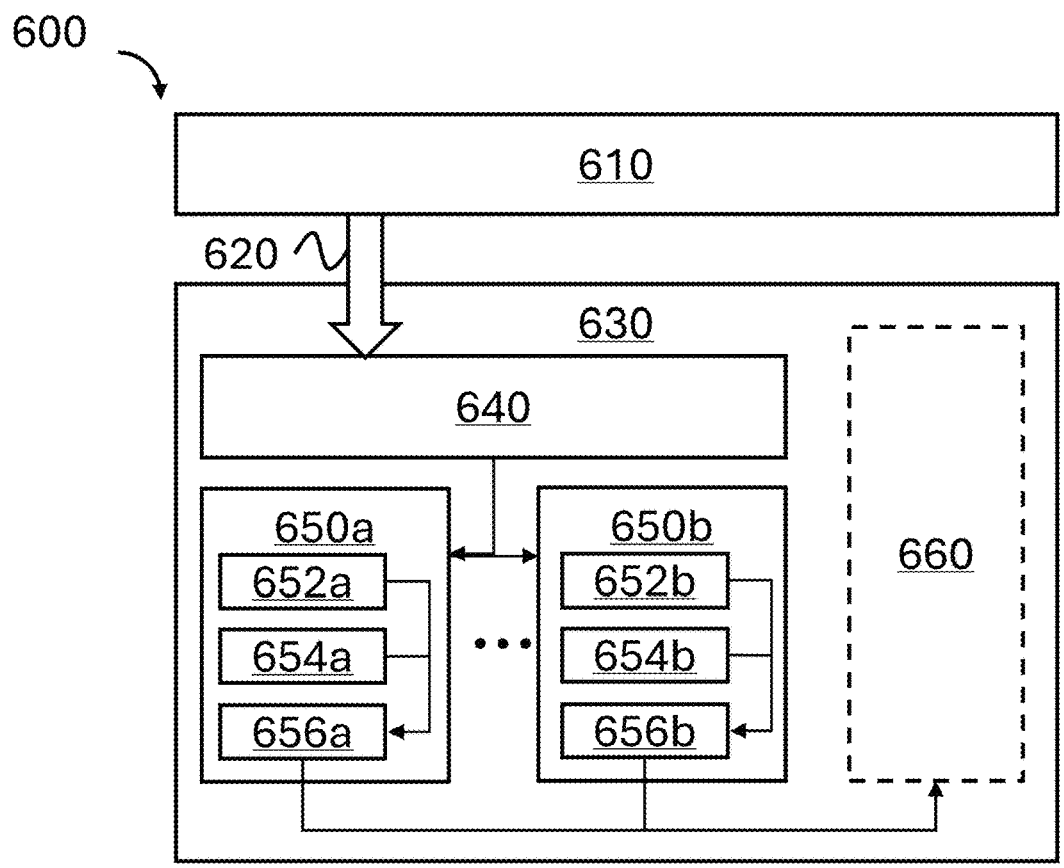
FIG. 1b is a schematic diagram of an example data processing system.

FIG. 1b shows schematically an example of a data processing system 600 including a processor 630 which may act as a co-processor or hardware accelerator unit for a host processing unit 610. It will be appreciated that the types of hardware accelerator which the processor 630 may provide dedicated circuitry for is not limited to that of Neural Processing Units (NPUs) or Graphics Processing Units (GPUs) but may be dedicated circuitry for any type of hardware accelerator. GPUs may be well-suited for performing certain types of arithmetic operations such as neural processing operations, as these operations are generally similar to the arithmetic operations that may be required when performing graphics processing work (but on different data formats or structures). Furthermore, GPUs typically support high levels of concurrent processing (e.g. supporting large numbers of execution threads), and are optimized for data-plane (rather than control plane) processing, all of which means that GPUs may be well-suited for performing other types of operations.

That is, rather than using entirely separate hardware accelerators, such as a machine learning processing unit that is independent of the graphics processor, such as an NPU, or only being able to perform machine learning processing operations entirely using the hardware of the GPU, dedicated circuitry may be incorporated into the GPU itself.

This means that the hardware accelerator circuitry incorporated into the GPU is operable to utilize some of the GPU's existing resources (e.g. such that at least some functional units and resources of the GPU can effectively be shared between the different hardware accelerator circuitry, for instance), whilst still allowing an improved (more optimized) performance compared to performing all the processing with general purpose execution.

As such, the processor 630 may be a GPU that is adapted to comprise a number of dedicated hardware resources, such as those which will be described below.

In some examples, this can be particularly beneficial when performing machine learning tasks that themselves relate to graphics processing work, as in that case all of the associated processing can be (and preferably is) performed locally to the graphics processor, thus improving data locality, and (e.g.) reducing the need for external communication along the interconnect with other hardware units (e.g. an NPU). In that case, at least some of the machine learning processing work can be offloaded to the machine learning processing circuit, thereby freeing the execution unit to perform actual graphics processing operations, as desired.

In other words, in some examples, providing a machine learning processing circuit within the graphics processor means that the machine learning processing circuit may then be operable to perform at least some machine learning processing operations whilst the other functional units of the graphics processor are simultaneously performing graphics processing operations. In the situation where the machine learning processing relates to part of an overall graphics processing task this can therefore improve overall efficiency (in terms of energy efficiency, throughput, etc.) for the overall graphics processing task.

In FIG. 1b, the processor 630 is arranged to receive task data 620 from a host processor 610, such as a central processing unit (CPU). The task data comprises at least one command in a given sequence, each command to be executed, and each command may be decomposed into a number of tasks, such as tasks discussed in this disclosure. These tasks may be self-contained operations, such as a given machine learning operation or a graphics processing operation. It will be appreciated that there may be other types of tasks depending on the command.

The task data 620 is sent by the host processor 610 and is received by a command processing unit 640 which is arranged to schedule the commands within the task data 620 in accordance with their sequence. The command processing unit 640 is arranged to schedule the commands and decompose each command in the task data 620 into at least one task. Once the command processing unit 640 has scheduled the commands in the task data 620, and generated a plurality of tasks for the commands, the command processing unit 640 issues each of the plurality of tasks to at least one compute unit 650*a*, 650*b* each of which are configured to process at least one of the plurality of tasks.

The processor 630 comprises a plurality of compute units 650*a*, 650*b*. Each compute unit 650*a*, 650*b*, may be a shader core of a GPU specifically configured to undertake a number of different types of operations, however it will be appreciated that other types of specifically configured processor may be used, such as a general-purpose processor configured with individual compute units, such as compute units 650*a*, 650*b*. Each compute unit 650*a*, 650*b* comprises a number of components, and at least a first processing module 652*a*, 652*b* for executing tasks of a first task type, and a second processing module 654*a*, 654*b* for executing tasks of a second task type, different from the first task type. In some examples, the first processing module 652*a*, 652*b* may be a processing module for processing neural processing operations, such as those which would normally be undertaken by a separate NPU. In these cases, the first processing module 652*a*, 652*b* is for example a neural engine. Similarly, the second processing module 654*a*, 654*b* may be a processing module for processing graphics processing operations forming a set of pre-defined graphics processing operations which enables the implementation of a graphics processing pipeline, which may be referred to as a graphics processor. For example, such graphics processing operations include a graphics compute shader task, a vertex shader task, a fragment shader tasks, a tessellation shader task, and a geometry shader task. These graphics processing operations may all form part of a set of pre-defined operations as defined by an application programming interface, API. Examples of such APIs include Vulkan, Direct3D and Metal. Such tasks would normally be undertaken by a separate/external GPU. It will be appreciated that any number of other graphics processing operations may be capable of being processed by the second processing module.

As such, the command processing unit 640 issues tasks of a first task type to the first processing module 652*a*, 652*b* of a given compute unit 650*a*, 650*b*, and tasks of a second task type to the second processing module 654*a*, 354*b* of a given compute unit 650*a*, 650*b*. The command processing unit 640 would issue machine learning/neural processing tasks to the first processing module 652*a*, 652*b* of a given compute unit 650*a*, 650*b* where the first processing module 652*a*, 652*b* is optimized to process neural network processing tasks, for example by comprising an efficient means of handling a large number of multiply-accumulate operations. Similarly, the command processing unit 640 would issue graphics processing tasks to the second processing module 654*a*, 654*b* of a given compute unit 650*a*, 650*b* where the second processing module 652*a*, 654*a* is optimized to process such graphics processing tasks. In some examples, the first and second tasks may both be neural processing tasks issued to a first processing module 652*a*, 652*b*, which is a neural engine. Such a neural processing task may involve the processing of a tensor, e.g. representing a feature map, with weights associated with a layer of a neural network.

In addition to comprising a first processing module 652*a*, 652*b* and a second processing module 654*a*, 654*b*, each compute unit 650*a*, 650*b* also comprises a memory in the form of a local cache 656*a*, 656*b* for use by the respective processing module 652*a*, 652*b*, 654*a*, 654*b* during the processing of tasks. Examples of such a local cache 656*a*, 656*b* is a L1 cache. The local cache 656*a*, 656*b* may, for example, a synchronous dynamic random-access memory (SDRAM). For example, the local cache 656*a*, 656*b* may comprise a double data rate synchronous dynamic random-access memory (DDR-SDRAM). It will be appreciated that the local cache 656*a*, 656*b* may comprise other types of memory.

The local cache 656*a*, 656*b* is used for storing data relating to the tasks which are being processed on a given compute unit 650*a*, 650*b* by the first processing module 652*a*, 652*b* and second processing module 654*a*, 654*b*. It may also be accessed by other processing modules (not shown) forming part of the compute unit 650*a*, 650*b* the local cache 656*a*, 656*b* is associated with. However, in some examples, it may be necessary to provide access to data associated with a given task executing on a processing module of a given compute unit 650*a*, 650*b* to a task being executed on a processing module of another compute unit (not shown) of the processor 630. In such examples, the processor 630 may also comprise storage 660, for example a cache, such as an L2 cache, for providing access to data for the processing of tasks being executed on different compute units 650*a*, 650*b*.

By providing a local cache 656*a*, 656*b* tasks which have been issued to the same compute unit 650*a*, 650*b* may access data stored in the local cache 656*a*, 656*b*, regardless of whether they form part of the same command in the task data 620. The command processing unit 640 is responsible for allocating tasks of commands to given compute units 650*a*, 650*b* such that they can most efficiently use the available resources, such as the local cache 656*a*, 656*b*, thus reducing the number of read/write transactions required to memory external to the compute units 650*a*, 650*b*, such as the storage 660 (L2 cache) or higher-level memories. One such example, is that a task of one command issued to a first processing module 652*a* of a given compute unit 650*a*, may store its output in the local cache 656*a* such that it is accessible by a second task of a different (or the same) command issued to a given processing module 652*a*, 654*a* of the same compute unit 650*a*.

One or more of the command processing unit 640, the compute units 650*a*, 650*b*, and the storage 660 may be interconnected using a bus. This allows data to be transferred between the various components. The bus may be or include any suitable interface or bus. For example, an ARM® Advanced Microcontroller Bus Architecture (AMBA®) interface, such as the Advanced eXtensible Interface (AXI), may be used.

Figure 2:
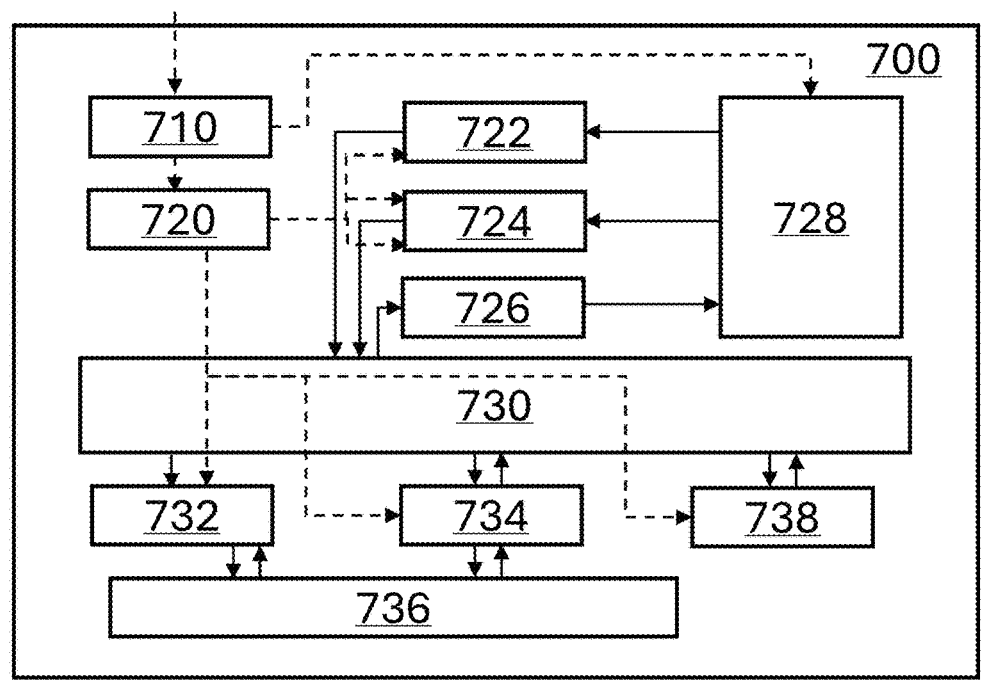
FIG. 2 is a schematic diagram of an example neural engine.

FIG. 2 is a schematic diagram of a neural engine 700, which in this example is used as a first processing module 652*a*, 652*b* in a data processing system 600 in accordance with FIG. 1*b*. The neural engine 700 includes a command and control module 710. The command and control module 710 receives tasks from the command processing unit 640 (shown in FIG. 1*b*), and also acts as an interface to storage external to the neural engine 700 (such as a local cache 656*a*, 656*b* and/or a L2 cache 660) which is arranged to store data to be processed by the neural engine 700 such as data representing a tensor, or data representing a stripe of a tensor. In the context of the present disclosure, a stripe is a subset of a tensor in which each dimension of the stripe covers a subset of the full range of the corresponding dimension in the tensor. The external storage may additionally store other data to configure the neural engine 700 to perform particular processing and/or data to be used by the neural engine 700 to implement the processing such as neural network weights.

The command and control module 710 interfaces to a handling unit 720, which is for example a traversal synchronization unit (TSU). In this example, each task corresponds to a stripe of a tensor which is to be operated upon in accordance with a sequence of operations according to at least a portion (e.g. a sub-graph) of the directed graph representation of the neural network. The tensor for example represents a feature map for processing using the neural network. A neural network typically includes a sequence of layers of processing, with an output from each layer being used as an input to the next layer. Each layer for example processes an input feature map by operating upon the input feature map to generate an output feature map, which is used as the input feature map for the next layer. The term "feature map" is used generically herein to refer to either an input feature map or an output feature map. The processing performed by a given layer may be taken to correspond to an operation.

In this example, the handling unit 720 splits data representing a stripe of a feature map into a plurality of blocks of data, each of which represents a respective part of the feature map. The handling unit 720 also obtains, from storage external to the neural engine 700 such as the L2 cache 660, task data defining operations selected from an operation set comprising a plurality of operations. In this example, the operations are structured as a progression of operations representing a sequence of layers of the neural network. A block of data is allocated as an input to one of the operations by the handling unit 720.

The handling unit 720 coordinates the interaction of internal components of the neural engine 700, which include a weight fetch unit 722, an input reader 724, an output writer 726, a direct memory access (DMA) unit 728, a dot product unit (DPU) array 730, a vector engine 732, a transform unit 734, an accumulator buffer 736, and a shared storage 738, for processing of blocks of data. The data dependencies across the functional units are tracked by the handling unit 720. Processing is initiated by the handling unit 720 in a functional unit if all input blocks are available and space is available in the shared storage 738 of the neural engine 700. The shared storage 738 may be considered to be a shared buffer, in that various functional units of the neural engine 700 share access to the shared storage 738.

In the context of a directed graph representing the operations to be performed, each of the internal components that operates upon data can be considered to be one of two types of component. The first type of component is an execution unit (and is identified within the neural engine 700 as such) that maps to a section that performs a specific instance of an operation within the directed graph. For example, the weight fetch unit 722, input reader 724, output writer 726, dot product unit array 730, vector engine 732, transform unit 734 each are configured to perform one or more predetermined and fixed operations upon data that it receives. Each of these sections can be uniquely identified with an identifier and each execution unit can also be uniquely identified.

Similarly, all physical storage elements within the neural engine (and in some instances portions of those physical storage elements) can be considered to be uniquely identified within the neural engine. The handling unit 720 is configured to allocate storage elements to respective connections in the directed graph, which can correspond to pipes as explained above. For example, portions of the accumulator buffer 736 and/or portions of the shared storage 738 can each be regarded as a storage element that can act to store data for a pipe or a sub-pipe within the directed graph, as allocated by the handling unit 720. A pipe or a sub-pipe can act as a connection between sections (as executed by execution units) to enable a sequence of operations as defined in the directed graph to be linked together within the neural engine 700. Put another way, the logical dataflow of the directed graph can be mapped to the physical arrangement of execution units and storage elements within the neural engine 700. Under the control of the handling unit 720, execution can be scheduled on the execution units and data can be passed between the execution units via the storage elements in accordance with the mapping, such that the linked operations of a graph can be executed without needing to write data memory external to the neural engine 700 between executions. The handling unit 720 is configured to control and dispatch work representing performing an operation of the graph on at least a portion of the data provided by a pipe or a sub-pipe.

The weight fetch unit 722 fetches weights associated with the neural network from external storage and stores the weights in the shared storage 738. The input reader 724 reads data to be processed by the neural engine 700 from external storage, such as a block of data representing part of a tensor. The output writer 726 writes data obtained after processing by the neural engine 700 to external storage. The weight fetch unit 722, input reader 724 and output writer 726 interface with the external storage (which is for example the local cache 656a, 656b, which may be a L1 cache such as a load/store cache) via the DMA unit 728.

Data is processed by the DPU array 730, vector engine 732 and transform unit 734 to generate output data corresponding to an operation in the directed graph. The result of each operation is stored in a specific pipe or sub-pipe within the neural engine 700. The DPU array 730 is arranged to perform one or more operations associated with a dot product operation between two operands, such as between an array of weights and a corresponding block of data (e.g. representing part of a tensor). The vector engine 732 is arranged to perform elementwise operations, for example to apply scale parameters to scale an output of a dot product calculated by the DPU array 730. Data generated during the course of the processing performed by the DPU array 730 and the vector engine 732 may be transmitted for temporary storage in the accumulator buffer 736 from where it may be retrieved by either the DPU array 730 or the vector engine 732 (or another different execution unit) for further processing as desired.

The transform unit 734 is arranged to perform in-block transforms such as dimension broadcasts or axis swaps. The transform unit 734 obtains data (e.g. after processing by the DPU array 730 and/or vector engine 732) from a pipe or a sub-pipe, for example mapped to at least a portion of the shared storage 738 by the handling unit 720. The transform unit 734 writes transformed data back to the shared storage 738.

To make efficient use of the shared storage 738 available within the neural engine 700, the handling unit 720 determines an available portion of the shared storage 738, which is available during execution of part of a first task (e.g. during processing of a block of data associated with the first task by the DPU array 730, vector engine 732 and/or transform unit 734). The handling unit 720 determines a mapping between at least one logical address associated with data generated during execution of a second task (e.g. by processing of a block of data associated with the second task by the DPU array 730, vector engine 732 and/or transform unit 734) and at least one physical address of the shared storage 738 corresponding to the available portion. The logical address is for example a global address in a global coordinate system. Hence, by altering the physical address corresponding to a given logical address, the handling unit 720 can effectively control usage of the shared storage 738 without requiring a change in software defining the operation to be performed, as the same logical address can still be used to refer to a given element of the tensor to be processed. The handling unit 720 identifies the at least one physical address corresponding to the at least one logical address, based on the mapping, so that data associated with the logical address is stored in the available portion. The handling unit 720 can perform the mapping process according to any of the examples herein.

In an analogous manner, the handling unit 720 can determine a mapping between logical storage locations (e.g. corresponding to respective logical addresses) corresponding to respective connections within the directed graph and sets of storage elements (e.g. corresponding to sets of physical addresses within storage of the neural engine 700, such as within the accumulator buffer 736 and/or the shared storage 738). In this way, the handling unit 720 can for example dynamically allocate first and second sets of storage elements to correspond to first and second logical storage locations associated with first and second operations (e.g. first and second sections) of the directed graph.

The handling unit 720 can for example allocate respective physical storage locations (e.g. corresponding to respective storage elements of the storage of the neural engine 700, such as respective buffers of the accumulator buffer 736 and/or the shared storage 738) for storing respective blocks generated by an operation of the directed graph, such as by a production operation. For example, the handling unit 720 can allocate a physical storage location for storing an intermediate block of intermediate data values generate by the production operation in determining a final block of final data values based on the intermediate block. In allocating the physical storage locations, the handling unit 720 may map logical storage locations (e.g. corresponding to respective logical addresses) corresponding to respective connections within the directed graph to respective sets of storage elements. The mapping may be performed dynamically by the handling unit 720, to utilize the storage of the neural engine 700 more efficiently.

It will be appreciated that in a graph of operations there does not need to be only a single instance of a particular type of operation. For example, multiple instances of a convolution operation could be present in a graph of operations. In the above example hardware arrangement only a single convolution engine may be present. Therefore, it will be appreciated that there does not need to be a direct 1:1 mapping between operations in the graph (sections) and execution units, and similarly no direct 1:1 mapping between pipes and storage elements and/or between sub-pipes and storage elements. In particular, a single execution unit may be configured at different instances in time to execute different instances of a convolution operation (e.g. first and second sections). Similarly, the input reader may be required to read data as part of different sections in the graph. The same can be said for storage elements and pipes and/or sub-pipes.

All storage in the neural engine 700 may be mapped to corresponding pipes and/or sub-pipes, including look-up tables, accumulators, etc., as discussed further below. The width and height of pipes and/or sub-pipes can be programmable, resulting a highly configurable mapping between pipes, sub-pipes and storage elements within the neural engine 700.

Ordering of execution of the sections is implied by dependencies on inputs. A memory load operation has no data dependencies (unless it is a gather operation), so is implicitly early in the graph. The consumer of the pipe (or sub-pipe) that the memory read produces is implicitly after the memory read. A memory store operation is near the end of the graph, as it produces no pipes or sub-pipes for other operations to consume. The sequence of execution of a progression of operations is therefore handled by the handling unit 720 as will be explained in more detail later.

Figure 3:
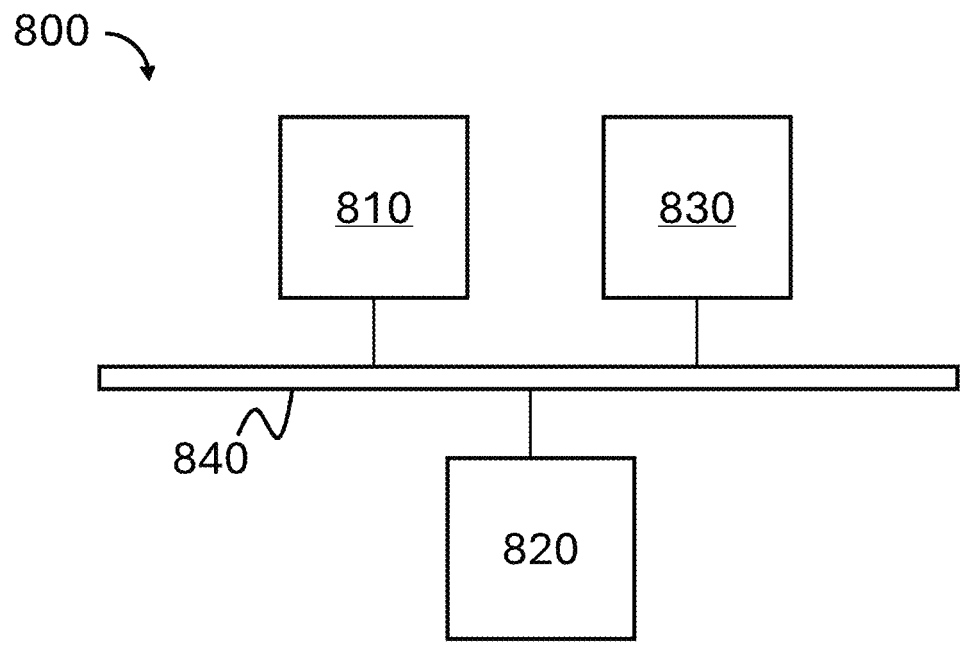
FIG. 3 is a schematic diagram of an example system for allocating handling data.

FIG. 3 shows schematically a system 800 for allocating handling data, and in some examples generating a plurality of blocks of input data for processing.

The system 800 comprises host processor 810 such as a central processing unit, or any other type of general processing unit. The host processor 810 issues task data comprising a plurality of commands, each having a plurality of tasks associated therewith.

The system 800 also comprises a processor 830, which may be similar to or the same as the processor 630 of FIG. 1b and may comprise at least some of the components of and/or be configured to perform the methods described above. The processor 830 comprises at least a plurality of compute units 650a, 650b and a command processing unit 640. Each compute unit may comprise a plurality of processing modules each configured to perform at least one type of operation. The system 800 may also include at least one further processor (not shown), which may be the same as the processor 830. The processor 830, and the host processor 810 may be combined as a System on Chip (SoC) or onto multiple SoCs to form one or more application processors.

The system 800 also comprises memory 820 for storing data generated by the tasks externally from the processor 830, such that other tasks operating on other processors may readily access the data. However, it will be appreciated that the external memory usage will be used sparingly, due to the allocation of tasks as described above, such that tasks requiring the use of data generated by other tasks, or requiring the same data as other tasks, will be allocated to the same compute unit 650a, 650b of a processor 830 so as to maximize the usage of the local cache 656a, 656b.

In some examples, the system 800 may comprise a memory controller (not shown), which may be a dynamic memory controller (DMC). The memory controller is coupled to the memory 820. The memory controller is configured to manage the flow of data going to and from the memory. The memory may comprise a main memory, otherwise referred to as a 'primary memory'. The memory may be an external memory, in that the memory is external to the system 800. For example, the memory 820 may comprise 'off-chip' memory. The memory may have a greater storage capacity than local caches of the processor 830 and/or the host processor 810. In some examples, the memory 820 is comprised in the system 800. For example, the memory 820 may comprise 'on-chip' memory. The memory 820 may, for example, comprise a magnetic or optical disk and disk drive or a solid-state drive (SSD). In some examples, the memory 820 comprises a synchronous dynamic random-access memory (SDRAM). For example, the memory 820 may comprise a double data rate synchronous dynamic random-access memory (DDR-SDRAM).

One or more of the host processor 810, the processor 830, and the memory 820 may be interconnected using a system bus 840. This allows data to be transferred between the various components. The system bus 840 may be or include any suitable interface or bus. For example, an ARM® Advanced Microcontroller Bus Architecture (AMBA®) interface, such as the Advanced eXtensible Interface (AXI), may be used.

Neural Engine Program Descriptor (NED)

As explained above, the neural engine 700 receives tasks from the command processing unit 640 to execute operations from the directed graph. The neural engine 700 is configured to execute operations selected from a base set of operations defining an operator set. One example of such an operator set is the Tensor Operator Set Architecture (TOSA) base inference profile, which defines a set of operations that can collectively be used to define the operations of a wide range of neural network operations. One exception to the TOSA operator set is control flow operations that may be implemented by way of task data processed by the command processing unit 640. It will be appreciated that there may be multiple neural engines with the processor 630 and thus multiple tasks can be issued concurrently to different neural engines.

In an example implementation, a task issued by the command processing unit 640 for execution by the neural engine 700 is described by task data which in this example is embodied by a neural engine program descriptor (NED), which is a data structure stored in memory and retrieved by the neural engine when executing the task issued by the command processing unit. The NED describes at least a portion of a complete graph of operations (sections) to be performed when executing the graph of operations (e.g. representing a neural network). As discussed above, sections are mapped to various hardware execution units within the neural engine 700 and essentially represent instantiations of a particular operator at a position within the graph. In one example, these sections are described by specific 'elements' that collectively define the operations forming part of the NED. Furthermore, the NED has an unordered list of pipes and/or sub-pipes (graph vertices) and an unordered list of sections/operations (graph nodes). Each operation specifies its input and output giving rise to adjacency of operation in the directed graph to which a particular operation is connected. An example NED comprises a NED structure comprising a header, the elements each corresponding to a section in the graph. The NED describes the various requirements of ordering, number and relationship of these sections and pipes and/or sub-pipes. In one implementation, each of the execution units and each storage element (or portion of a storage element) of the neural engine 700 has a sub-descriptor definition which defines how that execution unit/storage element can be configured for use in implementing a specific section, pipe or sub-pipe in the graph. An example of the hardware units and their corresponding elements is set out below:

Weight Fetch (WF): NEDWeightFetchElement
Input Reader (IR): NEDInputReaderElement
Output Writer (OW): NEDOutputWriterElement
Convolution Engine (CE): NEDConvolutionEngineElement
Transform Unit (TU): NEDTransformUnitElement
Vector Engine (VE): NEDVectorEngineElement The NED therefore may specify the execution unit or in other words specify a compatible execution unit for each operation. In embodiments there may be more than one execution unit of a given type such as InputReader may have two command queues which can operate concurrently. A NED may specify which of the queues is assigned so that there remains a 1:1 relationship between what the NED specifies and the physical hardware to which it points.

The dataflow and dependencies of the task's graph is described by pipes and/or sub-pipes. Pipes and/or sub-pipes are used to represent data storage elements within the neural engine 700 and describe the relationship between sections (operations) in a producer-consumer relationship: the output destination pipe or sub-pipe (e.g. a pipe or sub-pipe number) and each input source pipe or sub-pipe (e.g. a pipe or sub-pipe number) for every section is defined in the NED elements of the NED. Pipes and sub-pipes each have only a single producer but may have multiple consumers. A pipe and/or a sub-pipe may be mapped to one of several different physical storage locations (e.g. storage units in the neural engine 700), but not all physical storage locations may be suitable for the different section operations. It will be appreciated that, in some arrangements, a pipe may be mapped to only a portion of a storage unit, which may include at least one storage element. For example, a physical buffer (or a set of physical buffers, which may be or form part of a memory bank) may be considered to be a storage unit, and a physical address (or a set of physical addresses) corresponding to or within a physical buffer may be considered to be a storage element. For example, a storage unit may correspond to a set of physical buffers and a storage element may be a physical buffer of the set of physical buffers, the physical buffer comprising a set of physical addresses. In such cases, a pipe and/or a sub-pipe can describe double-buffering (for example) behavior between its producer and consumers. The output data generated by a section and stored in a pipe or a sub-pipe is referred to equivalently as both a block (of data) and a (virtual) buffer, with a block of data occupying one physical buffer location. Irrespective of location, pipes and/or sub-pipes may be non-coherent with a wider memory system associated with the neural engine 700 and with processor 630, and data is stored out using the Output Writer element of the neural engine 700.

In some arrangements the NED may be configured such that the same pipe is used for multiple inputs, where any relevant usage constraints (such as format or location) are satisfied. For example, an element-wise multiply might have the same pipe for the two input operands in order to square the input. In examples, though, the NED may be configured such that each sub-pipe has a single producer.

In some embodiments, sections such as InputReader and WeightFetcher have no input pipes and/or sub-pipes and instead their data comes from external memory, such as an external cache or DRAM. By contrast, some sections, such as OutputWriter have no output pipes or sub-pipes. In this case, their data is written to external memory.

For a section to run, it must have all the appropriate buffers available for its input source pipes and/or sub-pipes. A section may produce a new buffer in its output destination pipe or sub-pipe and so there must be space available in the pipe or sub-pipe for this new buffer. The neural engine 700 is responsible for tracking all of these dependencies as discussed further below with reference to FIGS. 4 to 10.

The NED also contains information that describes any divergent or convergent branches between sections and pipes/sub-pipes. For example the NED identifies, for each pipe and sub-pipe in the graph, the number of producers and consumers associated with respective pipes and sub-pipes. The NED may also comprise pointers to each of the sub-descriptor elements to enable the specific configuration of each element to be read by the handling unit 720.

Introduction to Storage Usage

Execution of certain tasks may involve reading, in a subsequent operation, a block generated by a previous operation, executed prior to the subsequent operation. For example, a production operation of the directed graph represented by the task data may comprise a set of sub-operations to be executed progressively in executing the production operation (e.g. by executing a first sub-operation, then a second sub-operation and so on). Progressive execution of the sub-operations in this case progressively generates respective blocks of data values (e.g. so that execution of the first sub-operation generates a first block, execution of the second sub-operation generates a second block and so on). In this way, execution of the set of sub-operations generates a corresponding set of blocks. Respective blocks of the set may depend on a previously-generated block, directly or indirectly, e.g. so that an intermediate block depends on a previous intermediate block generated previously within the set, and a final block of the set depends on the intermediate block. Rather than overwriting each intermediate block with a subsequent intermediate block, the handling unit 720 may maintain both the intermediate block and the subsequent intermediate block in the storage. The subsequent intermediate block may be generated immediately subsequently to the intermediate block (e.g. so that the intermediate block and the subsequent intermediate block are successive, i.e. consecutive, blocks within the set), in which case the intermediate block may be referred to as an N−1 block, and the subsequent intermediate block may be referred to as an N block. In such cases, the sub-operations to generate the N−1 and N blocks are consecutive sub-operations of the production operation. The blocks generated may correspond to respective portions of a multi-dimensional tensor. It is to be appreciated that execution of an operation may generate a plurality of final blocks of data values, for example so that each final block corresponds to a complete block which is not altered subsequently in executing the operation. For example, as explained above, each final block may correspond to a different subset of dimensions of a multi-dimensional loop of scalar operations.

Retaining N and N−1 blocks in storage in this manner can permit the execution of tasks involving the reading of an intermediate (N−1) block by a section other than the section that produced the intermediate block, such as a consumption operation. This approach can enable longer chains of operations. Data may be retained in local storage (such as storage of the neural engine 700, e.g. the accumulator buffer 736 and/or the shared storage 738) for longer periods of time in between cascades of operations or sub-operations. This can decrease the bandwidth for writing to and/or reading from external storage that is e.g. external to the neural engine 700.

It is to be appreciated that, in some cases, the handling unit 720 may control the execution circuitry of the neural engine 700 to retain more than two blocks of the set of blocks within the storage and/or to retain blocks that are generated with at least one intervening block therebetween within the set. For example, blocks N−k and N may be retained within the storage (where k is an integer with a value greater than 1), with or without at least one intervening intermediate block generated after the N−k block and before the N block.

Usage of the storage according to examples herein can permit the execution of a directed graph that involves loops, multiple connections between sections in the directed graph and/or reading of blocks (which may be intermediate blocks or final blocks) at different rates by different sections. The handling unit 720 configured as described herein can thus provide flexibility for the execution of a wider range of different tasks, with a greater range of relationships between respective operations of the tasks.

Flash Attention

As an example, the handling unit 720 configured herein can be used to coordinate execution of the flash attention algorithm described in Dao, Tri, et al. "Flashattention: Fast and memory-efficient exact attention with io-awareness." *Advances in Neural Information Processing Systems* 35

(2022): 16344-16359, the contents of which are incorporated by reference herein. Flash attention can be used for computing large language models with reduced memory footprint. However, it involves the calculation of running maximums and running sums.

Pseudo-code to execute the flash attention algorithm is as follows:

```
float flash_algorithm(float*a, float*b)
{
  float gsum=0.0;
  float gmax=-FLT_MAX;
  float accum=0;
  int num_blocks=ARRAY_SIZE/BLOCK_SIZE;
  for (int i=0; i<num_blocks; i++) {
    float sum, max;
    float t1[BLOCK_SIZE];
    float t2[BLOCK_SIZE];
    float*block_a=&a[i*BLOCK_SIZE];
    float*block_b=&b[i*IBLOCK_SIZE];
    max=maxof(block_a, BLOCK_SIZE);
    //determine new global max, newmax, and retain old
       global max, gmax, for scaling float new max=
       (max>gmax)?max:gmax;
    subtract_scalar(block_a, t1, newmax, BLOCK_
       SIZE);
    exponentiate(t1, t2, BLOCK_SIZE);
    //calculate running sum through all blocks
    //scaling ensures the sum is now scaled with the
       proper max
    float scaled_gsum-gsum*exp(gmax-newmax);
    float newsum=scaled_gsum+sumof(t2, BLOCK-
       _SIZE);
    accum=(1/newsum)*((accum*scaled_gsum)+dot-
       product(t2,block_b,BLOCK_SIZE));
    gmax=newmax; //block N (newmax) becomes block
       N-1 for next iteration of loop
    gsum=newsum; //block N (newsum) becomes block
       N-1 for next iteration of loop
  }
  return accum;
}
```

As can be seen from the above pseudo-code, in order to calculate an accumulated value (accum) it is necessary to read both block N (newmax, newsum) and N-1 (gmax, gsum) (at the lines above to calculate newmax, subtract_scalar, scaled_gsum and accum) and to write block N (newmax, newsum) (at the lines above to calculate newmax and newsum). Block N becomes block N-1 for the next iteration of the loop over the blocks (at the lines above to calculate gmax and gsum). In addition, the calculation of accum involves reading block N-1 (the value of accum before it is updated in the calculation of accum) and writing blockN (the updated value of accum).

The value of accum (e.g. stored in a particular storage element allocated to store this value) is read at different rates by different consumers (corresponding to different sections/operations) during the execution of the flash attention algorithm. The value of accum is read each iteration of the loop over the blocks (i.e. over num_blocks as shown in the pseudo-code above) and is read once every num_blocks when it is returned at the "return accum" line of the pseudo-code (by a different operation than the operation used to generate the value of accum within the loop).

In order to execute the flash attention algorithm, the handling unit 720 in examples is configured to allocate different storage elements for storing blocks generated in different iterations of the loop. Each iteration of the loop may be considered to correspond to a different respective sub-operation to generate a different respective block of data values, Fence, the handling unit 720 allocates a plurality of physical storage locations, each for storing a respective block (which may be a respective intermediate block of a plurality of intermediate blocks, generated in intermediate loop iterations after an initial iteration and prior to a final iteration). In this way, different physical storage locations can be written to for the different sub-operations (which may for example be or form part of a reduction operation). The handling unit 720 can thus prevent or restrict execution units from reading block N-1 and then overwriting block N-1 with N within a given loop by instead instructing the execution circuitry of the neural engine 700 (for executing the flash attention algorithm) to store block N-1 and block N in different physical storage locations to each other. To instruct the execution circuitry in this way, the handling unit 720 for example allocates a plurality of physical storage locations, each for storing a respective intermediate block of a plurality of intermediate blocks, e.g. so that different physical storage locations are allocated for storing the N and N-1 blocks (which may be each be respective intermediate blocks of the plurality).

The handling unit 720 may also instruct the execution circuitry to restrict overwriting of an intermediate block (such as block N-1) after storage of the intermediate block in the physical storage location, so as to maintain the N-1 block in the physical storage location for processing with the N block (which is stored in a different physical storage location by the execution circuitry, under the instruction of the handling unit 720).

In examples, the handling unit 720 is configured to allocate the plurality of physical storage locations in response to the task data being indicative that the directed graph comprises a consumption operation comprising processing of at least two (e.g. the N-1 and N) intermediate blocks with each other. The task data can thus indicate to the handling unit 720 that a plurality of intermediate blocks are to be retained in the storage so that each of the plurality can be read and processed together, e.g. in executing a particular sub-operation, rather than overwriting each intermediate block with the successive intermediate block.

It is to be appreciated, though, that the handling unit 720 may still instruct the execution circuitry to execute a further operation in which each block generated by the further operation overwrites a previous block generated by the further operation at a particular further physical storage location. The handling unit 720 can therefore support overwriting of intermediate blocks generated in executing particular operations, to provide additional flexibility.

Examples of Storage Usage

Usage of storage according to examples herein will now be described in more detail, with reference to FIGS. 4 to 10. Storage usage in accordance with these examples may provide the flexibility to implement a wide range of different algorithms, including the flash attention algorithm described above.

Figure 4:
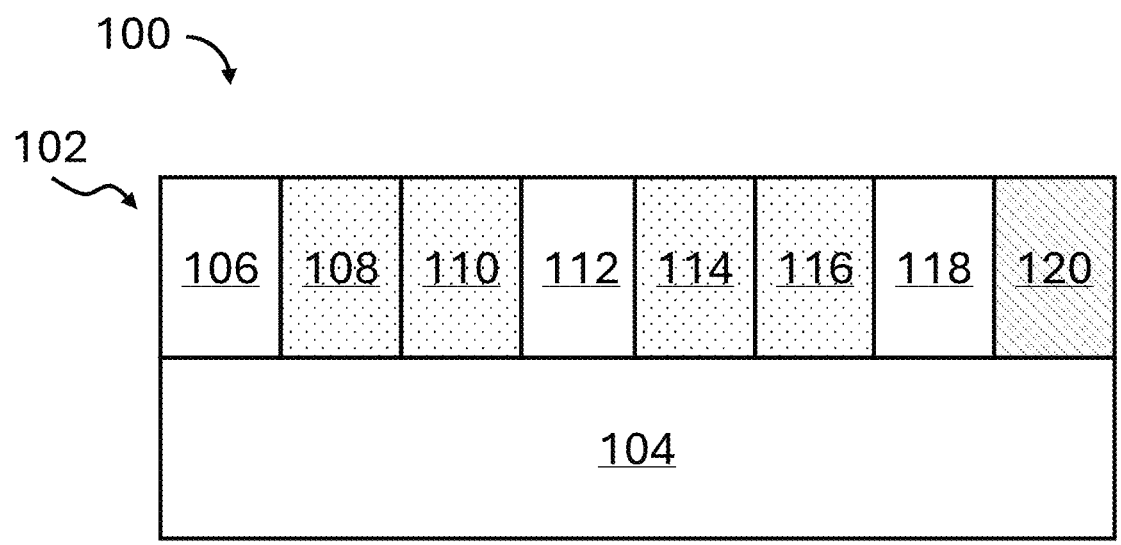
FIG. 4 is a schematic diagram of example storage.

FIG. 4 illustrates schematically storage 100 comprising two storage units 102, 104 each corresponding to a respective set of buffers, according to a simplified example. Each storage unit 102, 104 comprises eight buffers, each corresponding to a different respective storage element. Each of the storage elements corresponds to a different respective physical location within the storage unit 102, 104. The eight storage elements are labelled with reference numerals 106-

120 for the first storage unit 102 and omitted for the second storage unit 104, for clarity. The storage 100 of FIG. 4 may be used as storage of or accessible to the neural engine 700 of FIG. 2, such as the accumulator buffer 736 or the shared storage 738 (which may be referred to herein as a shared buffer). It is to be appreciated that the example of FIG. 4 is merely illustrative and in other cases a storage may include more or fewer storage units than two, a storage unit may be a different physical area of a storage than a set of buffers, a storage element may be a different component of a storage unit than a buffer and/or a storage unit may include more or fewer storage elements than eight.

In an example in which the storage 100 is used as the accumulator buffer 736, the storage 100 may be a high bandwidth SRAM static random access memory, which may be used to pass data between the convolution engine and the vector engine. The storage 100 may be partitioned such that portions of the convolution engine selectively communicate with specific banks of the storage 100, respectively. This may reduce The data routing and simplify the physical structure of the storage 100. The accumulator buffer 736 in this example is smaller than the shared storage 738 and therefore consumes less power per access than the shared storage 738. In a particular example, the accumulator buffer 736 comprises two buffers of 16K 32-bit accumulators each, such as two of the buffers 106-120 shown in the illustrative example of FIG. 4.

In the example of FIG. 4, the handling unit 720 is configured to allocate a first set of storage elements of the first storage unit 102 for respectively storing final blocks of final data values generated in executing a production operation and a second set of storage elements of the first storage unit 102 for respectively storing intermediate blocks of intermediate data values of generated in executing the production operation. In FIG. 4, a first, fourth and seventh storage element 106, 112, 118 are allocated to store the final blocks and second, third, fifth and sixth storage elements 108, 110 114, 116 are allocated to store respective intermediate blocks of the production operation. The intermediate blocks stored in the second and third storage elements 108, 110 are consecutive intermediate blocks generated by consecutive sub-operations of the production operation in FIG. 4 (e.g. corresponding to consecutive instances of a loop of a nested for-loop as described above), but need not be in other examples. The intermediate blocks stored in the fifth and sixth storage elements 114, 116 are similarly consecutive intermediate blocks generated by consecutive sub-operations of the production operation in FIG. 4, but need not be in other examples. In FIG. 4, the intermediate blocks of the second and third 108, 110 storage elements are used to generate the final block of the fourth storage element 112, whereas the intermediate blocks of the fifth and sixth storage elements 114, 116 are for generating the final block of the seventh storage element 118 (which for example corresponds to a final block for a different subset of dimensions). For example, each final block may be generated by applying the same processing (e.g. represented by the same set of sub-operations) to different respective input data, e.g. corresponding to a different respective input block of data corresponding to a different subset of dimensions as discussed above. Storage elements 106, 112, 118 allocated to store final blocks are indicated with no shading in FIG. 4 and storage elements 108, 110, 114, 116 allocated to store intermediate blocks are indicated with dotted shading in FIG. 4. An eighth storage element 120 is unallocated and is indicated with diagonal shading in FIG. 4.

In examples such as that of FIG. 4, the operations of the directed graph represented by the task data comprise operations connected by connections corresponding to respective logical storage locations. Storage elements of a given storage unit (the first storage unit 102 in FIG. 4) may be dynamically allocated to correspond to different logical storage locations, for storing different respective blocks. In FIG. 4, storage elements 108-118 are allocated to correspond to a sub-pipe for storing an output of the production operation.

In other examples, different storage elements of the same storage may be dynamically allocated to correspond to different sub-pipes, for storing respective outputs of different operations, corresponding to different respective logical storage locations. This allows multiple sections to write to the same physical storage. Each sub-pipe (e.g. corresponding to a respective set of storage elements) in these examples has a single producer and at least one consumer (where the producer and at least one consumer are respective sections of the directed graph). Sub-pipes may thus be used to pass data between respective sections, but with a plurality of sections sharing the same underlying physical storage. A region of storage within which different sub-pipes may be dynamically allocated may be considered to correspond to a multi-pipe. In examples, a multi-pipe is mapped by the handling unit 720 to a unique physical storage location. The physical storage location of a given multi-pipe does not overlap with the physical storage location of other multi-pipes (such as any other multi-pipe). However, a plurality of sub-pipes can be mapped to the same multi-pipe by the handling unit 720. The handling unit 720 can manage the mapping of the plurality of sub-pipes to the same physical storage by managing the status of each of the sub-pipes in a given multi-pipe to avoid data being incorrectly overwritten and so forth.

To simplify execution of the task, various properties of sub-pipes may be the same for all sub-pipes of a given multi-pipe, such as a number of storage elements (and/or storage units) for a given sub-pipe, a storage unit and/or storage comprising the storage elements (such as whether the storage elements are within the accumulation buffer 736 or the shared storage 738), a start memory bank at which a given storage unit associated with the multi-pipe starts, a number of memory banks for the given storage unit, a start memory word for the given storage unit, a number of memory words for the given storage unit, and so on. However, at least one property may differ between sub-pipes of a multi-pipe, such as data specific parameters, e.g. the data values to be written to a given sub-pipe, a format of the data values, whether the data values are signed values and so forth.

The mapping of a plurality of sub-pipes to the same multi-pipe may be indicated by the task data. For example, the task data may indicate that the first and second logical storage locations (associated with first and second operations of the directed graph) are each associated with a logical storage area. The handling unit 720 can then allocate a particular physical region of the storage 100, such as the first storage unit 102, to correspond to the logical storage area, based on the task data.

As noted above, in the example of FIG. 4, the handling unit 720 has dynamically allocated the storage elements 106-118 to correspond to a logical storage location associated with the production operation (i.e. a sub-pipe). In examples in which storage elements are dynamically allocated to respective sets of storage elements corresponding with different respective sub-pipes, each set may be disjoint from each other so that a given storage element of a storage unit is allocated to a single sub-pipe. This allows the operations to generate data to be stored in the respective sub-pipes to be executed at least partly concurrently without risking overwriting the data written to the respective sub-pipes (corresponding to the respective sets of storage elements).

It is to be appreciated that storage elements allocated to store intermediate blocks for a particular operation may be overwritten during execution of the operation, provided that a particular set of intermediate blocks is retained in the storage to permit execution of the operation and/or a consumption operation, if needed. For example, execution of respective sub-operations of a given production operation may involve processing N−1 and N intermediate blocks with each other, meaning that N−1 and N intermediate blocks should be retained to execute a given sub-operation. This is the case in the example of FIG. 4, in which the second and third storage elements 108, 110 are allocated to respectively store intermediate blocks of consecutive sub-operations of the production operation, which may be rewritten over time as successive intermediate blocks are generated by successive sub-operations of the production operation. For example, the second and third storage elements 108, 110 may store N−1 and N intermediate blocks for a given sub-operation of the production operation. At the next sub-operation, the N intermediate block becomes the N−1 intermediate block, and a new N intermediate block is generated (based on the N−1 intermediate block at the start of the subsequent iteration). At this stage, the third storage element 110 retains the data stored therein (which is now the N−1 intermediate block), and the handling unit 720 allocates the second storage element 108 to store the (new) N intermediate block generated by this subsequent sub-operation, which overwrites the N−1 intermediate block previously stored therein. In other examples, at least one further storage element may be allocated to store additional intermediate blocks so as to retain N−k to N intermediate blocks. In some cases, a respective intermediate block generated during execution of each of a plurality of sub-operations (and in some cases, each sub-operation) is retained in a respective storage element, allocated by the handling unit 720. For example, the intermediate blocks may be stored in respective storage elements without being overwritten, until the intermediate blocks have been consumed by each of their consumers (e.g. as indicated by the task data).

For example, as explained above, a plurality of sub-operations of a production operation may correspond to a respective loop over a dimension of a multi-dimensional nested loop. In such cases, each sub-operation may generate a respective intermediate block upon which a final block is based. The final block may be referred to as a completed block, which is generated upon completing the loop over the dimension. In this way, a plurality of intermediate blocks that the handling unit 720 allocates storage for may comprise at least an $N_{th}$ block generated within an $N_{th}$ iteration of the loop and an $(N-k)_{th}$ block generated within an $(N-k)_{th}$ iteration of the loop, where N is an integer with a value greater than k, and k is an integer with a value greater than or equal to 1 and less than N. For example, k may be 1, so that at least N and N−1 blocks of N and N−1 iterations over the loop in the dimension are stored in the storage 100. In other cases, though, k may greater than 1, so that more than two blocks, for more than two loop iterations within the dimension are retained in the storage 100, under the control of the handling unit 720, for consumption.

In some cases, the dimension for which the intermediate blocks are stored is the innermost dimension of the multi-dimensional nested loop. In these cases, intermediate blocks of consecutive loops may be generated consecutively, e.g. without the generation of other data in between by the execution of the production operation. The handling unit 720 may allocate consecutive storage elements for storing consecutively generated intermediate blocks of the innermost dimension, and may generate location data for each intermediate block, indicative of the storage element allocated to store the respective intermediate block.

In other cases, though, at least one further block of further data values may be generated between each pair of intermediate blocks. For example, where the loop is a first loop and the dimension is a first dimension, the multi-dimensional nested loop may comprise a second dimension, and the production operation may comprise at least one iteration of a second loop over the second dimension between consecutive iterations of the first loop over the first dimension. In such cases, the loop may be considered to be a multi-dimensional loop comprising a plurality of loops, each corresponding to a different respective dimension. In this example, the first loop is a first loop of the multi-dimensional loop (corresponding to the first dimension) and the second loop is a second loop of the multi-dimensional loop (corresponding to the second dimension), and so forth. Each of the at least one iteration of the second loop may generate a respective further block. The handling unit 720 may allocate a respective further physical storage location, such as a storage element of the storage 100 (e.g. of the same sub-pipe as allocated for the intermediate blocks of the first dimension) to store a respective further block. Indeed, in some cases there may be at least one iteration of a respective loop over each of at least one further dimension between consecutive iterations of the first loop over the first dimension to generate a respective further block of the at least one further block for each of the at least one iteration between each pair of intermediate blocks. For example, there may be I loops inward of the first dimension within the multi-dimensional nested loop, each of which may comprise a respective plurality of iterations. Each iteration of a loop of the I loops may generate a respective further block per iteration, which may be overwritten each time, i.e. so that only a completed (i.e. final) block remains once the iteration over that loop is complete, or at least a set of which are retained, in addition to the final block for that loop.

In these examples, at least one of the at least one further block may be stored between two consecutive intermediate blocks of the first dimension, e.g. so that two consecutive intermediate blocks are non-contiguous within the storage. This may complicate subsequent reading of the intermediate blocks from the storage, as it may no longer be sufficient to traverse through successive storage elements of the storage to traverse between successive intermediate blocks of a given dimension. However, by storing location data indicative of a physical storage location of a given block, such as a given intermediate block, the given block can be readily retrieved e.g. for consumption by a consumption operation, as described in more detail below.

In FIG. 4, the fifth and sixth storage elements 114, 116 are also allocated to respectively store intermediate blocks consecutive sub-operations of the production operation in a similar manner (but e.g. for a different input block of data representing a different subset of dimensions), to generate a different final block. Intermediate blocks upon which the final block stored in the first storage element 106 depends may previously have been stored in the first storage unit 102 but are no longer stored therein as they have been consumed by all of their consumers at the time illustrated in FIG. 4.

Figure 5:
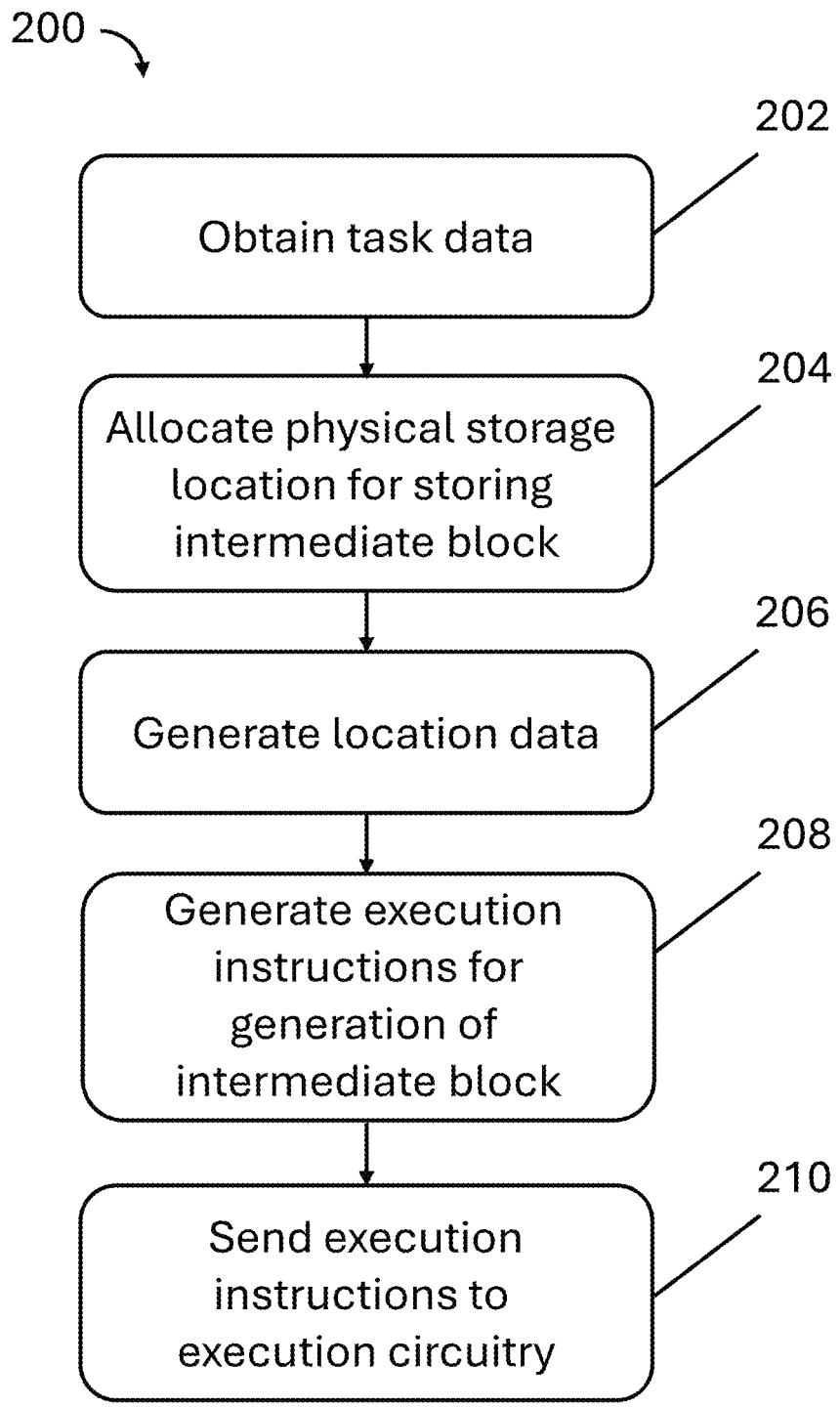
FIG. 5 is a flow diagram of a method of allocating storage.

FIG. 5 is a flow diagram illustrating a method 200 of allocating storage, which may be used to allocate the storage 100 of FIG. 4. At item 202 of the method 200, task data is obtained, which describes a task to be executed, comprising a plurality of operations representable as a directed graph of operations. The plurality of operations comprise a set of production operations comprising generating a set of blocks of data values (where a set of components may be considered to refer to at least one of the components, e.g. so that a single production operation may generate a plurality of blocks of data values, the plurality of blocks of data values may be generated by a plurality of production operations, and so forth). The set of blocks comprise an intermediate block of intermediate data values generated by a production operation of the set of production operations in determining a final block of final data values based on the intermediate block. The plurality of operations may further comprise a set of consumption operations, each comprising reading of at least one of the set of blocks.

Operations of the directed graph are connected by connections. Each connection corresponds to a pipe or a sub-pipe as described above. An extra field may be added to naming of a multi-pipe, as indicated by the task data (e.g. in the form of a NED) to indicate the sub-pipe. For simplicity, each pipe of a directed graph may be considered to be a multi-pipe even though some of the so-called multi-pipes may only have a single sub-pipe. For example, an identifier in the form of PX.Y (where "P0" indicates the multi-pipe and "Y" indicates the sub-pipe) may be used to uniquely identify multi-pipes (and sub-pipes of respective multi-pipes). For example, a section A may write to P0.0 and a section B may write to P0.1 (i.e. sections A and B may write to sub-pipes 0 and 1 of multi-pipe 0).

At item 204 of the method 200, a physical storage location of the storage is allocated for storing the intermediate block. The physical storage location may be a storage element, for example. The operations of the directed graph may comprise operations connected by connections corresponding to respective logical storage locations. The physical storage location may thus be mapped to a connection of the directed graph associated with generation of the intermediate block (e.g. corresponding to a pipe for receiving the intermediate block). This may involve mapping a logical storage location corresponding to the connection to the physical storage location, based at least partly on the task data. The method 200 of FIG. 5 may be performed by a processor to implement the production operation, but need not necessarily be performed by the same component of the processor as that used to implement the production operation. In examples in which the processor comprises the neural engine 700 of FIG. 2, the method 200 may be performed by the handling unit 720, and the production operation may be performed by an execution unit of the neural engine 720.

At item 206 of the method 200, location data indicative of the physical storage location is generated. For example, the location data may indicate a physical address of the storage element within the storage unit that is allocated to store the intermediate block at item 204.

At item 208 of the method, execution instructions to instruct the execution circuitry to at least partly execute the production operation to generate the intermediate block and to store the intermediate block in the physical storage location. The execution instructions comprise the location data, to provide an indication of the physical storage location to the execution circuitry. The execution circuitry is for example configured to implement an execution unit described above, such as the convolution engine or the vector engine. The execution instructions for example cause the execution circuitry to execute a portion of the production operation (such as a sub-operation, which may correspond to an instance of a loop of a nested for-loop) to generate the intermediate block.

At item 210 of the method 200 of FIG. 5, the execution instructions are sent to the execution circuitry to cause the execution circuitry to execute the at least part of the production operation.

The allocation of item 204 of the method 200 may be performed in response to the task data indicating that the intermediate block is to be consumed by a consumption operation of the plurality of operations of the task. For example, the task data may indicate that the intermediate block and at least one other intermediate block are to be processed together, e.g. to process the N−1 block with the N block. To indicate this, the task data may comprise control data, such as operation characteristic data associated with at least one operation of the task. The operation characteristic data for a given operation may include a bit (which may be referred to as a "read_previous" bit) that indicates whether execution of the operation comprises reading of a previous block (N−1 or N−k blocks) in addition to a current block (N block). If the "read_previous" bit is set to 1 for the consumption operation, this for example triggers the performance of item 204 for the production operation to allocate storage for storing the intermediate block to be consumed by the consumption operation.

The task data (e.g. as represented by the NED) may also include an "overwrite_intermediate" field for respective pipes indicating whether a production operation to generate the data to be stored in the respective pipe writes to a single physical storage location or to a plurality of physical storage locations (e.g. to store N−1 and N blocks and/or N−k and N blocks). In other cases, though, the task data may not include such a field. Instead, it may be determined (e.g. by the handling unit 720) from the directed graph itself whether a production operation writes to one or a plurality of physical storage locations, for example based on whether at least one consumption operation of a pipe reads previous (or intermediate) blocks.

Although the consumption operation may comprise reading of at least one intermediate block generated by the production operation, another consumption operation may comprise reading solely final blocks generated by at least one production operation. To allow the handling unit 720 to identify whether to provide intermediate blocks or final blocks to a given consumption operation, the task data may include an "incomplete" and/or "complete" field for respective consumption operations of the directed graph, indicative of whether the respective consumption operation reads solely final blocks or whether the consumption operation reads at least one intermediate block of at least one production operation. It is to be appreciated that a consumption operation that reads at least one intermediate block (indicated by an "incomplete" value of 1 and/or a "complete" value of 0) may also read at least one final block.

The method 200 may involve allocating at least one further physical storage location of the storage for storing at least one final block of final data values generated during execution of at least part of the task. This is the case in the example of FIG. 4, in which storage elements 112, 118 are allocated to store final blocks and storage elements 108, 110 and 114, 116 are allocated to store intermediate blocks. The final blocks within the storage can then be read by at least one consumption operation (which may involve reading solely final block(s) or a combination of final block(s) and intermediate block(s)). The at least one further physical storage location may be allocated in response to the task data being indicative that execution of the task comprises processing of the at least one final block. This may be the case where the "incomplete" field is 0 and/or the "complete" field is 1, or it may be determined based on the relationship between respective operations in the directed graph represented by the task data. Storage may be allocated for storing final blocks even if the "incomplete" field is 1 and/or the "complete" field is 0, as even if a consumption operation involves reading of intermediate (e.g. incomplete) block(s), this does not preclude the reading of final block(s) in additional to the intermediate block(s). In other words, the "incomplete" field being 0 and/or the "complete" field being 1 is sufficient to indicate that a final block should be stored but the "incomplete" field being 1 and/or the "complete" field being 0 is insufficient to indicate that a final block should not be stored.

The method 200 may involve allocating a physical storage location for storing a further intermediate block and for subsequently storing a further final block to overwrite the further intermediate block. For example, the task data may be indicative that, in executing the task, the further intermediate block upon which the further final block is based is unconsumed by at least one further consumption operation connected to the further operation (to generate the further final block) within the directed graph of operations. This may be indicated by the "incomplete" field taking a value of 0 and/or the "complete" field taking a value of 1, or it may be determined based on the relationship between respective operations in the directed graph represented by the task data. In such cases the handling unit 720 may be configured to allocate a given further physical storage location of the at least one further physical storage location for storing the further intermediate block and for subsequently storing the further final block to overwrite the further intermediate block. In this way, intermediate blocks may be overwritten by successive intermediate blocks and, eventually, by a final block.

Using the method 200 of FIG. 5, the physical storage locations may be dynamically allocated by the handling unit 720 at item 204, meaning that a given physical storage location may be allocated to store different respective blocks over time. For example, the first storage element 106 is allocated to store a final block of the production operation at a given time at which the storage 100 is shown in FIG. 4. However, at a different time, the first storage element 106 may be allocated to store a different final block or an intermediate block (which may be generated by the production operation or a different operation). Moreover, the physical storage locations may be allocated progressively (e.g. over time) as respective blocks are generated. For example, at a first time, none of the storage elements 106-120 may be allocated. Then, the first storage element 106 may be allocated to store the final block of the production operation and the remaining storage elements 108-120 may be unallocated. After this, the second storage element 108 may be allocated to store a first intermediate block of a first sub-operation of the production operation, and so on.

Allocation of the physical storage locations in this way may mean that consecutive final blocks may not be located contiguously with each within the storage 100. For example, at least one intermediate block may be interleaved between two final blocks. FIG. 4 shows such an example, in which the intermediate blocks are stored in the second and third storage elements 108, 110 and are thus disposed between the final blocks stored in the first and fourth storage elements 106, 112.

In general, physical storage locations (such as the storage elements 106-120 of FIG. 4) may be allocated by the handling unit 720 such that two of a plurality of physical storage locations, to which blocks generated successively in executing an operation are to be written, are non-contiguous with each other within the storage. For example, two consecutively generated intermediate blocks, generated in consecutive sub-operations of a given production operation (e.g. in consecutive instances of a given loop of a nested for-loop) may be stored non-contiguously within the storage, for example so that at least one further block is stored therebetween.

Dynamic allocation of storage in this way may result in storage elements of different respective sub-pipes being located non-contiguously with each other within the storage 100. Storage elements of a first sub-pipe may thus be interleaved with storage elements of a second sub-pipe and vice versa. For example, at least one storage element of the second sub-pipe may be disposed between a first storage element of the first sub-pipe and a second storage element of the first sub-pipe within the storage unit.

As physical storage locations for storing successive blocks (e.g. successive intermediate blocks and/or successive final blocks) may be non-contiguous within the storage 100, it may not be sufficient to merely track the head and tail of the physical storage locations in order to identify a particular physical storage location storing a particular block and/or to identify available physical storage locations that are available for allocation to store a given block. Hence, in examples herein, the handling unit 720 is configured to track usage of the physical storage locations (e.g. the storage elements 106-120 of FIG. 4) during execution of the task, and to allocate the physical storage locations at least partly based on the usage tracked by the handling unit 720. For example, the handling unit 720 may track the usage to identify which storage elements are available for allocation to store a block, such as the intermediate block, and then allocate an available storage element for storing the intermediate block. The handling unit 720 may determine which of a plurality of available storage elements to allocate to store a particular block based on at least one further rule, for example to optimize usage of the storage 100, e.g. such that the storage elements allocated to store final blocks are more compactly distributed within the storage 100 than otherwise.

The location data generated at item 206 of the method 200 of FIG. 5 may be used to track usage of the storage, to assist in determining an appropriate physical storage location for storing a given block. The location data generated at item 206 of the method 200 of FIG. 5 may also or alternatively be used to locate a particular block within the storage, for example so that the block may be consumed (e.g. read or otherwise processed) by at least one consumption operation.

In examples, location data is generated for each of a set of blocks generated during execution of a set of production operations by the execution circuitry. In this way, a set of location data indicative of respective physical storage locations allocated for storage of respective blocks of the set of blocks (e.g. by the handling unit 720) can be generated.

Figure 6:
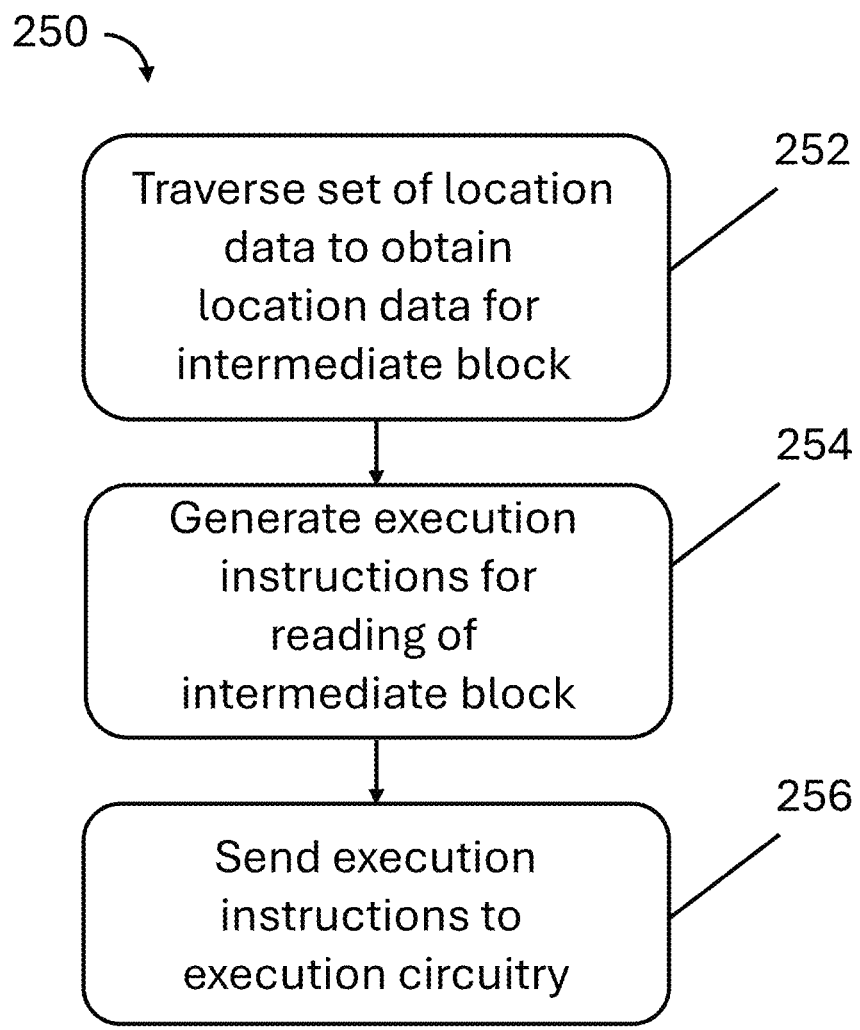
FIG. 6 is a flow diagram of a method of instructing execution of at least part of a consumption operation.

FIG. 6 is a flow diagram of a method 250 of instructing execution of at least part of a consumption operation. The method 250 of FIG. 6 may be performed after performing the method 200 of FIG. 5, and in some cases after performing the method 200 of FIG. 5 a plurality of times. In such cases, the execution instructions of item 210 of FIG. 5 may be considered to be production execution instructions. The consumption operation instructed by the method 250 of FIG. 6 comprises reading of an intermediate block, such as the intermediate block allocated to be stored in the physical storage location represented by the location data in the method 200 of FIG. 5. The consumption operation may comprise at least partial reading of a sub-pipe. In such cases, the task data may indicate the sub-pipe the consumption operation is configured to read data from.

The method 250 of FIG. 6 may be performed by a processor to implement the consumption operation, but need not necessarily be performed by the same component of the processor as that used to implement the consumption operation. In examples in which the processor comprises the neural engine 700 of FIG. 2, the method 250 may be performed by the handling unit 720, and the consumption operation may be performed by an execution unit of the neural engine 720.

At item 252 of the method 250 of FIG. 6, the set of location data is traversed to obtain location data indicative of the physical storage location for storing the intermediate block. Examples of traversing the set of location data are described further below with reference to FIGS. 7 to 9.

At item 254 of the method 250 of FIG. 6, execution instructions to instruct the execution circuitry to execute at least part of the consumption operation to read the intermediate block from the physical storage location are generated. The execution instructions comprise the location data, to provide an indication of the physical storage location to the execution circuitry. The execution instructions for example cause the execution circuitry to execute a portion of the consumption operation (such as a sub-operation, which may correspond to an instance of a loop of a nested for-loop) to read the intermediate block. For example, the consumption operation may comprise a plurality of sub-operations, each involving reading of at least one different intermediate block. The execution instructions at item 254 may be referred to as consumption execution instructions.

At item 256 of the method 250 of FIG. 6, the execution instructions are sent to the execution circuitry to cause the execution circuitry to execute the at least part of the consumption operation.

Figure 7:
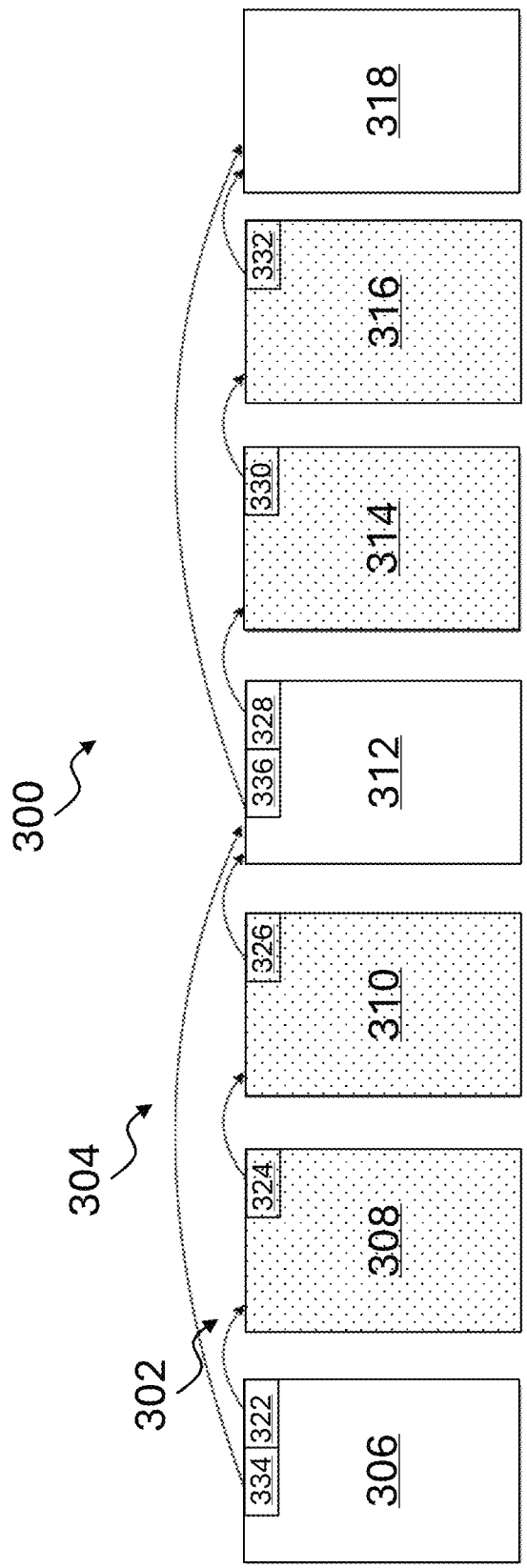
FIG. 7 is a schematic diagram of a linked list for tracking storage usage according to an example.

FIG. 7 shows an example of tracking of the usage of the storage elements 106-120 of FIG. 4, in which a data structure is used to track allocation of the storage elements 106-120 to store respective blocks generated in executing operations of a directed graph. In the example of FIG. 7, the data structure is a linked list 300. The linked list 300 is used to track allocation of storage elements to store respective blocks generated by the production operation. The linked list 300 includes first entries 306, 312 and 318 corresponding to the storage elements 106, 112 and 118, which correspond to final blocks and second entries 308, 310, 314 and 316 corresponding to the storage elements 108, 110, 114 and 116, which correspond to intermediate blocks. The first entries 306, 312 and 318 are shown unshaded and the second entries 308, 310, 314 and 316 are shown with dotted shading in FIG. 7.

The linked list 300 is populated by the handling unit 720 progressively, as the operations are scheduled by the handling unit 720. The handling unit 720 schedules the operations to sequentially write blocks to respective storage elements in an order at least partly based on the usage tracked by the handling unit 720. The order may be determined dynamically by the handling unit 720 based on which storage elements of the storage 100 are available as respective blocks are generated. The order may thus be generated progressively and added to over time with the generation of additional blocks.

In the example of FIGS. 4 and 7, the handling unit 720 determines from the task data that the task comprises the production operation, which is to be executed by the neural engine 700. Based on the task data, the handling unit 720 allocates the first storage unit 102 of the storage 100 to correspond to a sub-pipe for storing an output of the production operation, and then dynamically allocates respective storage elements of the first storage unit 102 to store blocks generated in executing the production operation over time. Although not shown, it is to be appreciated that the handling unit 720 may dynamically allocate storage elements of the first storage unit 102 to correspond to a different sub-pipe for storing an output of a different operation.

The handling unit 720 tracks usage of the first storage unit 102 over time and in this example generates various control data on a per buffer basis (i.e. for each storage element of the storage unit 102). The per buffer control data may be referred to herein as storage element characteristic data for a given storage element. The handling unit 720 may also generate operation characteristic data as described further above. FIGS. 10*a* to 10*g* illustrate an example of per buffer controls for a different example to that of FIG. 7, with a smaller number of buffers for ease of illustration, although it is to be appreciated that similar control data to that shown in FIGS. 10*a* to 10*g*. FIGS. 10*a* to 10*g* illustrate on example of updating storage element characteristic data during execution of a task.

Figures 9, 10A:
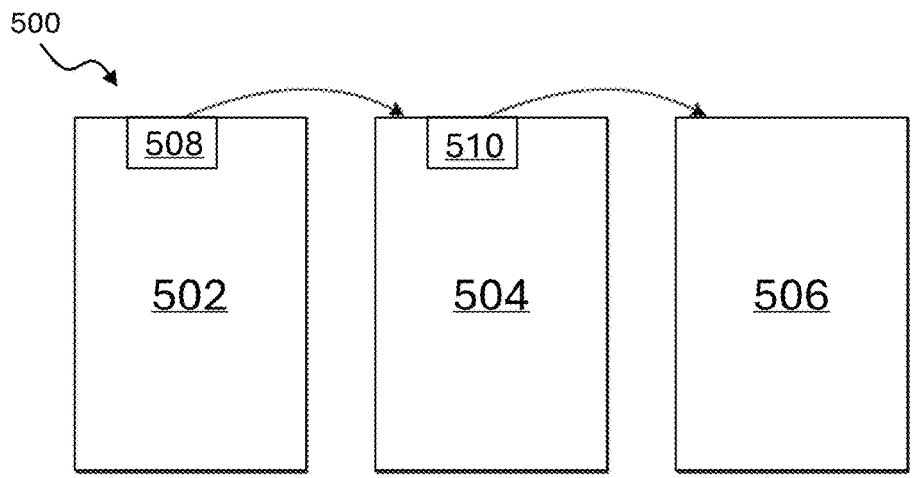
Figure 11:
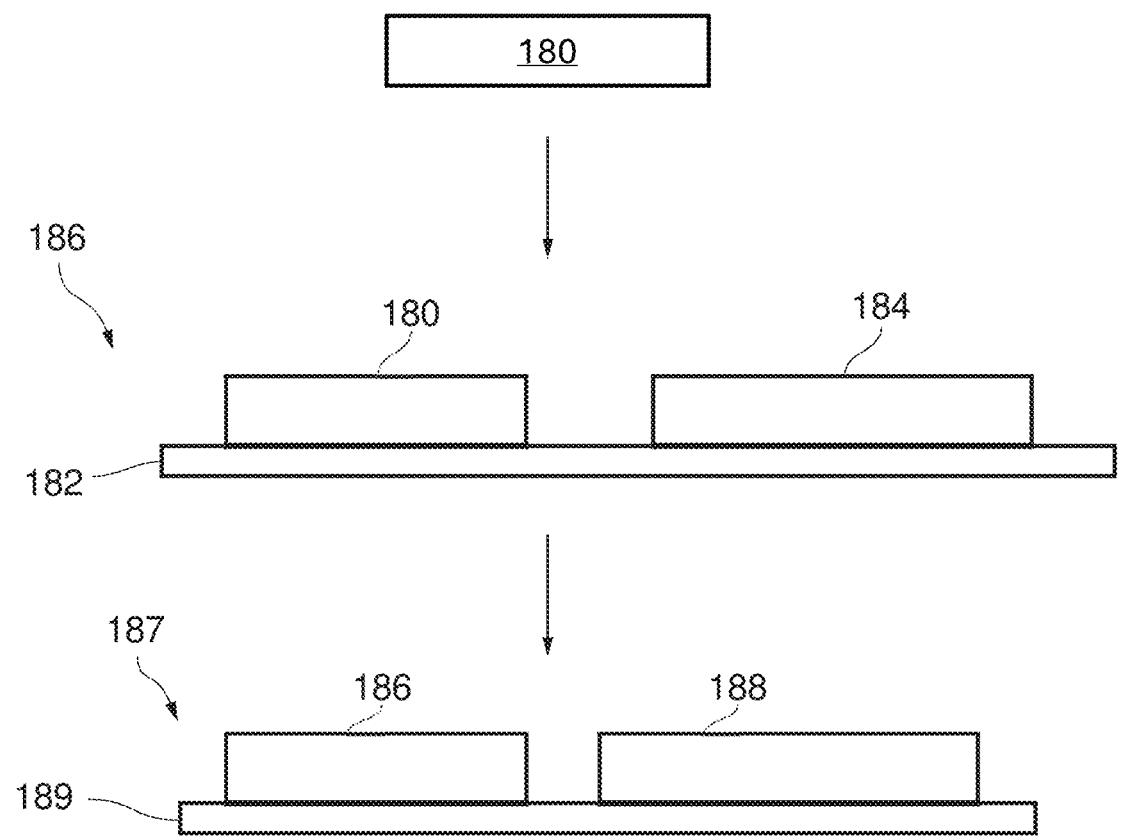
FIG. 11 is a schematic diagram of manufacture of a system and a chip-containing product.

FIG. 10*a* is a table 600 of per buffer controls, and includes an "Allocated" field indicative of whether a given storage element (which in FIG. 10*a* is a buffer, numbered from Buffer0 to Buffer3) is allocated to a particular sub-pipe. The "Allocated" field therefore indicates whether the given storage element is allocated to a logical storage location as indicated by the task data, such as a logical storage location corresponding to the sub-pipe. In FIG. 10*a*, the "Allocated" field is a bit for each storage element, which takes a value of 0 if the given storage element is unallocated to a sub-pipe and a value of 1 if the given storage element is allocated to a sub-pipe. The table 600 of FIG. 10*a* shows that each of the buffers are unallocated.

The table 600 of FIG. 10*a* includes a "Free" field, which is a bit per consumption operation indicating whether the given storage element is available for data to be written thereto by a production operation. The task data for example indicates that, for a given sub-pipe, there is a production operation (production section) that produces the sub-pipe and at least one consumption operation (consumption section), corresponding to a consumer, that reads from the sub-pipe. Hence, the consumer(s) of a given sub-pipe, for which the free value is to be determined, can be determined by the handling unit 720 from the task data. In the example of FIGS. 10*a* to 10*g*, there is a single consumer so a single "Free" value is indicated per buffer (which is for that consumer). In other examples, there may be a plurality of consumers, e.g. up to 4 consumers, in which case, the control data may represent a "Free" value per buffer and per consumer. In such cases, the control data may also include a "Combined Free" value per storage element (e.g. per buffer), based on a combination of the "Free" values per consumer, for a given storage element. For example, the "Combined Free" value for a given storage element may represent an "AND" of the per-consumer "Free" values for that storage element, at a particular time. In these cases, the "Combined Free" value may be 1 if each of the per-consumer "Free" values for the storage element are also 1 (i.e. if each of the consumers of the data stored in the storage element have finished consuming the data stored therein). In other cases with a plurality of consumers, though, whether a particular storage element is available for data to be written thereto may be determined by the handling unit 720 from the per-consumer "Free" values for that storage element without separately storing a "Combined Free" value.

The "Free" field takes a value of 1 for each buffer in the example of FIG. 10*a*, which would indicate that the buffers are free if they were allocated to a sub-pipe. However, when a given buffer is unallocated to a sub-pipe (in this case, with an "Allocated" field having a value of 0), the "Free" field has no meaning. As each of the buffers are unallocated, none of the buffers can be written to or read from unless they are first allocated to a sub-pipe, despite the "Free" fields having a value of 1. A "Free" field with a value of 0 indicates that a buffer is not available to be written to.

The table 600 of FIG. 10*a* also includes a "Valid" field (per consumer), which is a bit per consumption operation indicating whether the given storage element is storing valid data to be read therefrom (by the consumption operation). In FIG. 10*a*, there are two consumption operations: "C0 (intermed)" and "C1 (completed)", and a "Valid" field for each of these consumption operations. "C0 (intermediate)" represents a first consumption operation which comprises reading of each block produced (including intermediate blocks), and "C1 (completed)" represents a second consumption operation that skips over intermediate blocks and reads each completed block (which are referred to as final blocks in examples herein, including the example of FIGS. 10*a*-10*g*). The task data for example indicates that, for a given sub-pipe, there is a production operation (production section) that produces the sub-pipe and at least one consumption operation (consumption section), corresponding to a consumer, that reads from the sub-pipe. Hence, the consumer(s) of a given sub-pipe, for which the "Valid" value is to be determined, can be determined by the handling unit 720 from the task data. A value of the "Valid" field of 0 indicates invalid data within a given sub-pipe for a given consumer and a value of the "Valid" field of 1 indicates valid data within a given sub-pipe for a given consumer. The table 600 of FIG. 10*a* indicates that the "Valid" field has a value of 0 for each buffer and for each consumer. As for the "Free" field, the value of the "Valid" field for a given buffer has no meaning unless that buffer is allocated to a sub-pipe (in this case, with an "Allocated" field having a value of 1).

The table 600 of FIG. 10*a* also includes a "Sub-pipe" field indicative of the sub-pipe to which a given buffer is allocated. The "Sub-pipe" field thus indicates which logical storage location a given storage element is allocated to, and for example is a unique identifier of the sub-pipe. In FIG. 10*a*, the table 600 indicates that none of the buffers have been allocated to a sub-pipe, as none of the buffers have an identifier associated with the sub-pipe field for that buffer.

In addition, the table 600 of FIG. 10*a* indicates the next buffer location for final blocks (indicated by the field "Next buf (completed)" in the table 600) and for intermediate blocks (indicated by the field "Next buf (intermed)" in the table 600). The next buffer location for final blocks is a unique identifier of a physical storage location of a storage element corresponding to a successive final block generated successively after the final block of the corresponding buffer (if that buffer stores a final block) in executing the task. The next buffer location for intermediate blocks is a unique identifier of a physical storage location of a storage element corresponding to a successive intermediate block generated successively after the intermediate block of the corresponding buffer (if that buffer stores an intermediate block) in the sub-pipe. In other examples, though, the next buffer location for final and/or intermediate blocks may identify the location of the next storage element in a different manner, such as by a physical address of the next storage element. In the table 600 of FIG. 10*a*, the "Next buf (completed)" and "Next buf (intermed)" fields have a null value for each of the buffers as the buffers are not yet allocated to a sub-pipe.

In general, the next buffer location may be indicated in the form of an entry associated with a particular field of the table 600. It is to be appreciated that the next buffer locations of the table 600 may be stored in a data structure such as the table 600 and/or may be determined from, or otherwise represented by, at least one data structure used to track an order in which data is written to respective storage elements of a set of storage elements (corresponding to a sub-pipe), such as the linked list 300 of FIG. 7, without separately storing data representative of the next buffer location in a table such as the table 600 of FIG. 10*a* (or other data structure). For example, the at least one data structure used to track the order of writing data to the storage may include at least a portion of control data such as that shown in FIG. 10*a*.

Although FIG. 10*a* shows control data in the form of a table, the control data (or a portion thereof) need not be stored in a table and may instead be stored in a different format. For example, the control data may merely be a collection of bits each representing a control value for a given buffer and/or sub-pipe, which may be stored in various different data structures, including a linked list, such as the linked list 300 of FIG. 7.

Returning to FIGS. 4 and 7, the usage of the storage elements 106-120 tracked by the handling unit 720 may be used by the handling unit 720 to assist in scheduling operations of the directed graph, such as operations corresponding to sections that produce or consume a sub-pipe corresponding to at least one of the storage elements 106-120. The handling unit 720 also updates various control data as sections (operations) are issued, to keep track of current usage of the storage (as discussed further below with reference to FIGS. 10*a* to 10*g*).

At a time of scheduling an initial sub-operation of the production operation, the entire first storage unit 102 is available for storing an initial block generated by executing the initial sub-operation in the example of FIGS. 4 and 6. The handling unit 720 determines that each of the storage elements 106-120 is available and allocates a storage element of the storage for storing the initial block. The handling unit 720 generates a data structure (in this case, the linked list 300) and populates the linked list 300 with an entry comprising initial location data indicative of a physical storage location of a storage element allocated to store the initial block. The entry comprises the initial location data indicative of the physical storage location. For example, the initial location data may indicate a physical address of the storage element within the first storage unit 102. The handling unit 720 sends execution instructions, comprising the initial location data, to execution circuitry of the neural engine 700 to instruct the execution circuitry to execute the initial sub-operation of the production operation to generate the initial block and store the initial block in the storage element.

The handling unit 720 allocates a further storage element of the storage to store an intermediate block generated by executing the production operation. The handling unit 720 may therefore use two of the storage elements for storing N–1 and N intermediate blocks used to generate a final block. The handling unit 720 also allocates an additional storage element for storing the final block. In this example, upon generation of the final block, the final block is stored in the first storage element 106 and the N–1 and N intermediate blocks are stored in the second and third storage elements 108, 110 respectively. The handling unit 720 may send execution instructions for each sub-operation together, e.g. as a single command to the execution circuitry, or separately, e.g. as a series of commands to the execution circuitry.

The handling unit 720 then schedules a further initial sub-operation of the production operation to be executed by the execution circuitry of the neural engine 700, in order to generate a further initial block (e.g. based on different input data than that used to generate the initial block). In this example, the N–1 and N intermediate blocks in the second and third storage elements 108, 110 are consumed by a consumption operation prior to scheduling the further initial sub-operation, and can thus be overwritten. In other words, these blocks are no longer available. At this time, the linked list 300 comprises a first entry 306 comprising first location data indicative of the first storage element 106, which stores the final block. Other entries of the linked list 300 corresponding to the second and third storage elements have been removed, as the data in these elements is no longer available. This is merely illustrative though, and in practice, N–1 and N blocks for generating a given final block will typically be retained in storage during generation of a successive final block, to allow for greater parallelization.

In this example, though, the second to eighth storage elements 108-118 are available for storing the further initial block and the first storage element 106 is occupied by the initial block. The handling unit 720 determines that second to eighth storage elements 108-120 of the first storage unit 102 are available, for example based on the control data discussed above and/or the linked list 300, and allocates a storage element of the storage (in this case, the second storage element 108) for storing the further initial block. The handling unit 720 then populates the linked list 300 with the second entry 308. The second entry 308 comprises second location data indicative of a physical storage location of the second storage element within the first storage unit 102. For example, the second location data may be similar to the first location data, and may indicate a physical address of the second storage element 108 within the first storage unit 102. The handling unit 720 sends execution instructions, comprising the second location data of the second entry 308, to execution circuitry of the neural engine 700 to instruct the execution circuitry to execute the further initial sub-operation to generate the further initial block and store the further initial block in the second storage element 108.

The handling unit 720 progressively allocates respective storage elements of the first storage unit 102 to store respective blocks generated by the production operation and generates respective location data indicative of a location of each respective storage element, in a similar manner to allocation of the first and second storage elements 106, 108. The handling unit 720 progressively creates new entries of the linked list 300 as storage elements of the first storage unit 102 are newly allocated to store the respective blocks. Respective execution instructions are sent to the execution circuitry of the neural engine 700, comprising respective location data indicative of a location in which the respective blocks are to be stored, to instruct generation of the respective blocks. In this way, third to seventh entries 310-318 are successively added to the linked list 300 by the handling unit 720, respectively comprising location data indicative of a location of the third to seventh storage elements 110-118 in which respective blocks generated in executing the task are to be stored.

The linked list 300 may be considered order data that is indicative of an order associated with respective blocks generated in executing the task. The order may be an order which the respective blocks are written to respective physical storage locations. As explained above, execution of a given operation may involve generating a plurality of blocks comprising at least one intermediate block upon which a final block is based. For example, the plurality of blocks may comprise a plurality of intermediate blocks and a plurality of final blocks. Each final block may depend on a different subset of the plurality of intermediate blocks. In such cases, each of the plurality of blocks, including each intermediate block, may be written to the storage without overwriting a previously generated block. In other words each block of the plurality of blocks may be written to different respective physical storage location, such as a different respective storage element. Each block may then be retained in the respective physical storage location to which it was written until it has been consumed by each consumer of the block (e.g. as defined by the task data). For example, as described with reference to FIGS. 10*a*-10*g*, the handling unit 720 may track whether consumption of a particular block is complete and whether a particular physical storage location storing the particular block is therefore available to be written to. The handling unit 720 may then allocate the particular physical storage location for storage of further data once consumption of the particular block has finished.

In some cases, a subset of the plurality of blocks (such as a subset of intermediate blocks) are written to the storage at a given time, with newly generated blocks overwriting previously generated blocks. For example, a newly generated block (which may be an intermediate or final block) may overwrite a prior block generated prior to the newly generated block (which itself may be an intermediate or final block) if consumption of the prior block has finished and the handling unit 720 has reallocated a portion of the storage for storing the prior block to store the newly generated block. This may occur for example if a size of a storage (or portion thereof) for storing blocks generated in executing an operation (such as a set of storage elements corresponding to a particular sub-pipe associated with storing data generated in executing the operation) is smaller than a combined size of each of the blocks. In such cases, a block may be overwritten in the storage once usage of the block in executing the operation and any consumption operation(s) comprising reading of the block have finished.

In some cases, at least one intermediate block may overwrite at least one prior intermediate block generated prior to the at least one intermediate block in determining a given final block. For example, the prior intermediate block may be overwritten once the handling unit 720 has ascertained that consumption of the prior intermediate block has finished. In these cases, the order associated with the blocks may indicate that the order comprises M intermediate blocks (e.g. between two final blocks), but the actual instance of these M intermediate blocks may vary over time, as new intermediate blocks are newly generated and overwrite previous intermediate blocks. The M intermediate blocks stored at a given time may nevertheless remain in the same position within the order, to reduce complexity.

In general, the handling unit 720 may predefine the order and generate the data structure (such as the linked list 300) to indicate the order. The location data of each of the entries 306-318 of the linked list 300 may together be considered to be a set of location data. The arrangement of the set of location data within a data structure (in this case, the linked list 300) may be considered to indicate the order.

A data structure such as the linked list 300 of FIG. 7 may provide flexibility for the reading of intermediate and/or final blocks. For example, a data structure (such as the linked list 300 of FIG. 7) may comprise final entries storing respective final location data of the set of location data for a respective final block of final data values and intermediate entries storing respective intermediate location data of the set of location data for a respective intermediate block of intermediate data values. In such cases, for consumption operations comprising reading of intermediate and final blocks, the set of location data (comprised by the data structure) may be traversed via both the intermediate and final blocks, which are for example arranged in an order indicative of the order in which the blocks are stored in the storage. However, for consumption operations comprising reading at least one of the final blocks without reading the intermediate blocks, traversing the set of location data may comprise traversing through the data structure via the final entries by skipping respective intermediate entries. For example, the set of location data may be traversed by moving from final entry to final entry, bypassing an intermediate entry or entries between successive final entries. This may be more efficient and allow the final entries to be identified more straightforwardly than otherwise.

In FIG. 7, the linked list 300 is what may be referred to herein as a skipping linked list, with a first traversal path 302 for traversing therethrough and a second traversal path 304 for traversing therethrough, wherein the second traversal path 304 comprises a subset of entries along the first traversal path 302. The linked list 300 of FIG. 7 comprises a first set of pointers 322, 324, 326, 328, 330, 332 indicative of the first traversal path 302 and a second set of pointers 334, 336 indicative of the second traversal path 304. The entries of the first traversal path 302 may be taken to correspond to final entries as discussed above (which may be referred to as completed entries) and the entries of the second traversal path 304 may be taken to correspond to intermediate entries as discussed above. Hence, in cases in which a given consumption operation does not involve reading intermediate blocks, the first traversal path 302 can be utilized, and the second traversal path 304 can be skipped.

For the first set of pointers 322, 324, 326, 330, 332 in FIG. 7, a given pointer for a given physical storage element (e.g. storage element) for storing a given block points to a location of a successive physical storage location for storing a successive block, successive to the given block according to the order. A given pointer of the first set for a particular entry of the linked list 300 in this example points to a successive entry of the linked list 300, which comprises successive location data indicative of the physical storage location of the successive storage element. The given pointer of the first set thus points to the location data for the successive storage element by pointing to the successive entry within the linked list 300 (comprising the location data for the successive storage element). For example, the first entry 306 of the linked list 300 comprises first location data indicative of a physical storage location of the first storage element 106, as well as a pointer 322 of the first set to the second entry 310 of the linked list 300, which comprises second location data indicative of the second storage element 108, which is associated with a second block, consecutive to the block stored within the first storage element 106 according to the order. Similarly, the second entry 310 of the linked list 300 comprises a pointer 326 of the first set to a third entry 312 of the linked list 300. The third entry 312 of the linked list 300 comprises a pointer 328 of the first set to a fourth entry 316 of the linked list 300. The fourth entry 316 of the linked list 300 is the final entry of the linked list 300 at the time illustrated in FIG. 7 and thus does not comprise a pointer of the first set to a subsequent entry.

Thus, the entries 306-318 along the first traversal path 302 comprise intermediate entries (the second, third, fifth and sixth entries 308, 310, 314, 316) for respective intermediate blocks, and final entries (the first, fourth and seventh entries 306, 312, 318) for respective final blocks, which are arranged to indicate the order. In this case, the order of the blocks is therefore: a final block, two intermediate blocks, a final block, two intermediate blocks, and then a final block. The pointers 322, 324, 326, 328, 330, 332 of the first set, indicating the first traversal path 302, therefore point to the next block in order, whether that block is an intermediate block or a final block.

The linked list 300 also comprises the second set of pointers 334, 336 indicative of the second traversal path 304. For the second set of pointers 334, 336, a given pointer for a given physical storage element for storing a given final block points to a location of a successive physical storage location for storing a successive final block, successive to the final given block according to the order. In FIG. 7, the first entry 306 of the linked list 300 comprises a pointer 334 to the fourth entry 312 of the linked list 300, which is allocated to store the next final block, e.g. a second final block, after a given final block, e.g. a first final block, according to the order associated with the blocks (e.g. defined by the handling unit 720). The order of the final blocks may be referred to as a second order, with an overall order of each of the blocks referred to as a first order. The fourth entry 312 comprises a pointer 336 to the seventh entry 318 of the linked list 300, which is allocated to store a third final block after the second final block, according to the order associated with the blocks. The seventh entry 318 of the linked list 300 is the final entry of the of the linked list 300 at the time illustrated in FIG. 7 and thus does not comprise a pointer to a subsequent entry. The first, fourth and seventh entries 306, 312, 318 of the linked list 300 are a subset of entries of the linked list 300, arranged to indicate the order of the final blocks. The first, fourth and seventh entries 306, 312, 318 are arranged along the second traversal path 304.

FIG. 7 illustrates the first traversal path 302 and the second traversal path 304 as separate traversal paths within the same linked list 300. However, the first and second traversal paths 302, 304 may each be taken to correspond to a respective linked list, which may be stored separately or together.

To track usage of the storage elements 106-120, the handling unit 720 may track a head and/or a tail of a data structure such as the linked list 300. The linked list 300 is updated over time during use of the storage. It is to be appreciated that the entries of a linked list, such as the linked list 300 of FIG. 7, may comprise at least a portion of the control data as discussed above. For example, a given entry may comprise at least part of the "Per buffer controls" discussed with reference to FIG. 10a, for the storage element corresponding to the given entry. In such cases, the handling unit 720 updates the control data stored in the linked list as storage elements are allocated to respective sub-pipes, as data within respective storage elements is consumed by consumption operation(s), and so forth.

The usage tracked by the handling unit 720 may be used by the handling unit 720 to allocate storage element(s) for storing block(s) generated in executing a task and/or in scheduling consumption operations comprising reading of at least one of the blocks stored in the storage. For example, the linked list 300 generated by the handling data 720 allows the physical storage location for different respective portions of data (such as different blocks) of outputs of different operations to be readily identified. This can facilitate re-use of the data before it is overwritten or otherwise removed from the storage. For example, a set of location data indicative of respective physical storage locations for storing respective blocks generated in executing a task can be traversed, e.g. by traversing the linked list 300 of FIG. 7 along the first and/or second traversal path 302, 304, by the handling unit 720 to identify the physical storage location of a particular storage element storing a particular block to be processed at a given time, as represented by the location data. In this way, the physical storage location of particular blocks can be identified in a flexible manner so that particular blocks can be re-used as desired (for example, as scheduled by the handling unit 720 to reduce data transfer between various components of the neural engine 700).

For example, in response to the task data being indicative that a given consumption operation to be scheduled by the handling unit 720 comprises reading of a particular intermediate block, the handling unit 720 may traverse the linked list 300 along the first traversal path 302, to identify the entry of the linked list 300 corresponding to the particular intermediate block. The handling unit 720 may traverse the linked list 300 along the first traversal path 302 for example by following the pointers 322-332 along the first traversal path 302 until the entry corresponding to the particular intermediate block is reached. At this point, the handling unit 720 can obtain the location data from that entry, indicative of the physical storage location (e.g. the particular storage element) storing the particular intermediate block. The handling unit 720 can then generate and send execution instructions to instruct the execution circuitry to execute at least part of the given consumption operation comprising reading the particular intermediate block, with the execution instructions comprising the location data to indicate the physical storage location of the particular intermediate block to the execution circuitry.

The task data may indicate that an initial sub-operation of the given consumption operation comprises reading a predefined block of data values prior to reading of an intermediate block. In such cases, the handling unit 720 allocates an initialization physical storage location of the storage for storing the predefined block, generates initialization location data indicative of the initialization physical storage location and includes the initialization location data within the set of location data (e.g. within the linked list 300 that is traversed to identify a particular physical storage location for use in executing a given consumption operation). For example, where sub-operations of the given consumption operation comprise reading N−1 and N blocks, there may not yet be an N−1 block generated for the initial sub-operation to consume (e.g. if the production operation has only generated a single, initial, block). In such cases, in order for the initial sub-operation to proceed, another block (the predefined block) must be processed with the initial block generated by the production operation. The predefined block may be considered to correspond to an initialization pipe for initialization of the consumption operation.

The predefined block may for example be a block of predefined data values. The predefined data values may be constant values, which may depend on the consumption operation to be performed. For example, the constant values may be 0 for a sum or 1 for a production. In other cases, though, the predefined block is or comprises a further block of further data values generated by a further production operation of the set of production operations and/or a prior block of prior data values generated by a prior operation of a prior task executed by the execution circuitry. For example, the predefined block may be a block stored in the same storage unit as a storage element allocated to store the initial block generated by the production operation, e.g. generated by the further production operation. In other cases, though, the predefined block may be stored in a different storage or a different storage unit. This may be the case where the predefined block comprises the prior block. The predefined block may be or comprise the prior block if for example a directed graph to be executed has been split across a plurality of tasks, each corresponding to a different sub-graph and represented by different task data (e.g. different NEDs). In other cases, though, the handling unit 720 may instruct the execution circuitry to generate predefined data values for processing with the initial block during execution of the consumption operation, to reduce memory accesses.

In these examples, the handling unit 720 is configured to instruct execution of the initial sub-operation of the consumption operation by traversing the set of location data (in this case, the linked list 300) to obtain the initialization location data indicative of the initialization physical storage location for storing the predefined block. The handling unit 720 can then generate and send initial execution instructions, comprising the initialization location data, to instruct the execution circuitry to execute the initial sub-operation to read the predefined block from the initialization physical storage location.

If the task data indicates that a further consumption operation comprises reading a given final block of the plurality of final blocks without reading the plurality of intermediate blocks, the handling unit 720 can traverse the linked list 300 along the second traversal path 304 (e.g. by following the pointers 334, 336 along the second traversal path 304) to obtain further location data indicative of a further physical storage location for storing the given final block. For example, if the further consumption operation comprises reading the third final block, the handling unit 720 can traverse the linked list 300 along the second traversal path 304 to reach the seventh entry 318 and obtain the location data stored therein (which may be referred to as the further location data) indicating the physical storage location (which may be referred to as the further physical storage location) of the seventh storage element 118, which stores the third final block. Traversing the linked list 300 along the second traversal path 304 provides for more efficient identification of a physical storage location of a given final block, as traversing the second traversal path 304 skips entries of the first traversal path 302 corresponding to intermediate blocks, meaning that fewer entries may be traversed than if final blocks are identified via the first traversal path.

The handling unit 720 may use additional control information to traverse a set of location data such as that stored in the linked list 300 of FIG. 7. For example, if at least one further block of further data values (e.g. corresponding to an iteration over an inward dimension of a nested for-loop) is generated and stored in the storage between two consecutive intermediate blocks (e.g. correspond to consecutive iterations over an outer dimension of the nested for-loop, outer with respect to the inward dimension), the set of location data may include further location data indicative of a further physical storage location of each of at least one further block. In such cases, count data indicative of a number of further blocks of the at least one further block between each pair of intermediate blocks may be used to traverse the set of location data. For example, the handling unit 720 may, based at least partly on the count data, skip a particular number of entries of the set of location data (e.g. corresponding to respective entries of the linked list 300 corresponding to further blocks) to go between consecutive intermediate blocks. A consumption operation operating on two consecutive intermediate blocks with respect to the outer dimension therefore may operate on blocks with k−1 further blocks between them, where k is the number of iterations of inward dimensions of a nested for loop. The count data may be obtained from the task data. For example, the count data may represent a given value representing the number of further blocks, or the count data may represent an offset value from which the number of further blocks can be calculated. In other cases, the count data may be derived by the handling unit 720 from the task data, e.g. from the directed graph, for example as the number of steps of at least one inner loop of the nested for-loop, which is inwards of the dimension in which the intermediate blocks are generated.

After obtaining the further location data, the handling unit 720 can generate and send further execution instructions to instruct the execution circuitry to execute the further consumption operation to read the given final block from the further physical storage location. The further execution instructions comprise the further location data in this case.

The task data may indicate whether a given consumption operation reads intermediate blocks or not by the form of the directed graph itself or by control data as discussed above. In FIG. 7, if the task data indicates that the given consumption operation reads intermediate blocks, the handling unit 720 traverses the linked list 300 along the first traversal path 302, whereas if the task data indicates that the given consumption operation does not read intermediate blocks (and thus reads solely final blocks), the handling unit 720 traverses the linked list 300 along the second traversal path 304.

Figure 8:
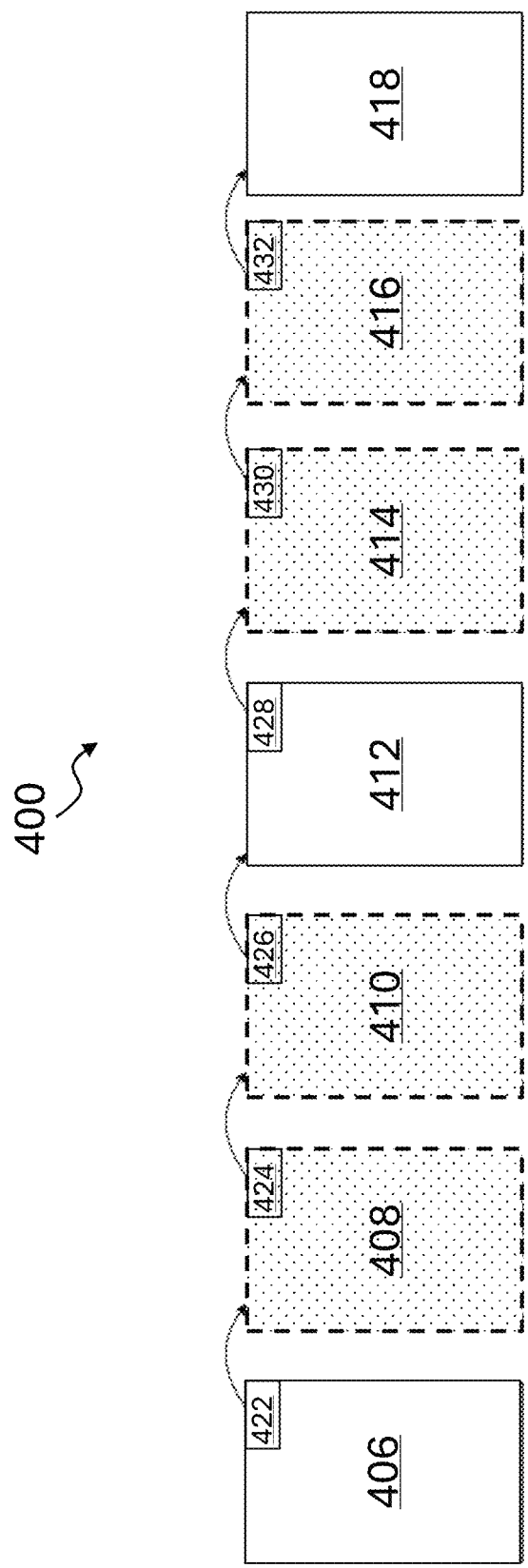
FIG. 8 is a schematic diagram of a linked list for tracking storage usage according to a further example.

FIG. 8 shows another example of a data structure for tracking usage of storage. The data structure of FIG. 8 is a linked list 400, which is similar to the linked list 300 of FIG. 7 and includes seven entries 406-418 corresponding to the seven entries 306-318 of FIG. 7. However, unlike the linked list 300 of FIG. 7, the linked list 400 of FIG. 8 includes a single set of pointers 422, 424, 426, 428, 430, 432, which correspond to the first set of pointers 322-332 of FIG. 7. The pointers 422-432 of FIG. 7 are between each entry of the linked list 400 (i.e. so that a first pointer 422 is from a first entry 406 of the linked list 400 to a second entry 408, a second pointer 424 is from the second entry 408 to a third entry 408, and so forth). As in FIG. 7, first entries 406, 412 and 418 of the linked list 400 of FIG. 8 correspond to the storage elements 106, 112 and 118 of FIG. 4, which correspond to final blocks of the production operation and second entries 408, 410, 414 and 416 correspond to the storage elements 108, 110, 114 and 116 of FIG. 4, which correspond to intermediate blocks of the production operation. The first entries 406, 412 and 418 are shown unshaded and the second entries 408, 410, 414 and 416 are shown with dotted shading in FIG. 8.

The linked list 400 of FIG. 8 is generated in the same way as the linked list 300 of FIG. 7. The linked list 400 of FIG. 8 is traversed in the same way as traversing the first traversal path 302 of the linked list 300 of FIG. 7 to obtain location data for an intermediate block, which it can use to instruct execution of a consumption operation comprising reading the intermediate block.

For the further consumption operation that does not involve reading intermediate blocks, e.g. that comprises reading a given final block of a set of blocks represented by the linked list 400 without reading the intermediate blocks of the set, discussed above with reference to FIG. 7, the handling unit 720 of FIG. 8 traverses the linked list 400 by traversing from pointer to pointer. In response to traversing an entry of the linked list corresponding to the given final block (such as the first, fourth or seventh entries 406, 412, 418), the handling unit 720 obtains further location data indicative of a further physical storage location for storing the given final block. The handling unit 720 can then generate and send further execution instructions, comprising the further location data, to instruct the further consumption operation to read the given final block, as described with reference to FIG. 7.

However, in response to traversing an entry of the linked list corresponding to an intermediate block (such as the second, third, fifth or sixth entries 408, 410, 414, 416), which may be referred to as an intermediate entry, the handling unit 720 of FIG. 8 suppresses reading of the intermediate block by the execution circuitry (for example in executing the further consumption operation). For example, the handling unit 720 may suppress the sending of execution instructions corresponding to intermediate blocks (which may be referred to as intermediate further execution instructions instructing reading of the intermediate block) to the execution circuitry, so as to suppress reading of the intermediate blocks. For example, the handling unit 720 may only send execution instructions for the final blocks. This may be simpler to implement than the example of FIG. 7 as the handling unit 720 need not keep track of two sets of pointers.

FIG. 9 shows another example of a data structure for tracking usage of storage, which is another linked list 500. If a given production operation produces data for which intermediate blocks are not to be consumed (e.g. if only final blocks need be retained for reading by at least one consumption operation), the handling unit 720 can instruct the execution circuitry performing the given production operation to only output the final blocks. For example, a particular physical storage location may be allocated for storage of the blocks produced by the given production operation, with each block being overwritten by the next block, until the final block remains in the particular physical storage. In such cases, the handling unit 720 can generate a linked list such as the linked list 500 of FIG. 9, which only includes entries corresponding to final blocks. Hence, in FIG. 9, the linked list 500 includes first, second and third entries 502, 504, 506 corresponding to first, second and third final blocks, respectively. The first entry 502 comprises a first pointer 508 to the second entry 504 and the second entry 504 comprises a second pointer 510 to the third entry 506. Each of the entries 502-506 comprises respective location data indicative of a location of a physical storage location for storing the respective final block, as allocated by the handling unit 720.

As explained above, there does not need to be a direct 1:1 mapping between operations and execution units. However, in some examples, the execution circuitry comprises first execution circuitry configured to implement a first execution unit and second execution circuitry configured to execute a second execution unit and the handling unit 720 unit is configured to allocate the first execution unit for execution of a production operation (e.g. for producing an intermediate block as discussed above) and the second execution element for execution of the consumption operation (such as the consumption operations discussed with particular reference to FIGS. 7 and 9).

Updating of Control Data

An example of updating control data during execution of a production operation will now be discussed with reference to FIGS. 10a to 10g.

FIG. 10a shows control data (in this example, a table 600 of per buffer controls) for a storage unit in an initial state, prior to execution the production operation. FIG. 10a is described in detail above.

FIG. 10b shows the table 600 of per buffer controls upon issuance of an initial sub-operation of the production operation. In FIG. 10b, Buffer0 is allocated for storing an initial block generated by the initial sub-operation, and thus has an "Allocated" value of 1. The "Free" value of Buffer0 is set to 0 as Buffer0 is no longer free. The remaining control data remains the same as in FIG. 10a.

FIG. 10c shows the table 600 of per buffer controls upon completion of the initial sub-operation. In FIG. 10c, Buffer0 now stores valid data for a consumer of intermediate blocks (C0 (intermed), which is a consumption operation comprising reading of intermediate blocks), and thus has an "Valid C0 (intermed)" value of 1. This value is set to 1 for completion of each sub-operation (e.g. corresponding to a first reduction of a plurality of reductions to generate a final block of data values). The remaining control data remains the same as in FIG. 10b.

FIG. 10d shows the table 600 of per buffer controls upon issuance of an intermediate sub-operation. In FIG. 10d, Buffer1 is allocated for storing an intermediate block generated by the intermediate sub-operation, and thus has an "Allocated" value of 1 and a "Free" value of 0. Buffer0 and Buffer1 are both allocated to sub-pipe 0 (as indicated by the "Sub-pipe" fields for these buffers). The "Next buf (completed)" field for Buffer0 is indicated as 1 to indicate the next buffer of the sub-pipe. The remaining control data remains the same as in FIG. 10c.

FIG. 10e shows the table 600 of per buffer controls upon completion of the intermediate sub-operation. In FIG. 10e, Buffer1 now stores valid data for a consumer of intermediate blocks (C0 (intermed), which is a consumption operation comprising accumulation), and thus has an "Valid C0 (intermed)" value of 1. In this case, valid blocks are stored in both Buffer0 and Buffer1, which may be N–k and N blocks as discussed above (where k may be greater than or equal to 1), which may be consumed by the C0 (intermed) consumption operation. The remaining control data remains the same as in FIG. 10d.

FIG. 10f shows the table 600 of per buffer controls upon issuance of a final sub-operation. In FIG. 10f, Buffer2 is allocated to sub-pipe 0 (with a "Sub-pipe" value of 0), so the "Allocated" value for Buffer2 is updated to 1 and the "Next buf (intermed)" value for Buffer1 is updated to 2 to indicate the next buffer of sub-pipe 0. Buffer2 is no longer free, so has a "Free" value of 0. The remaining control data remains the same as in FIG. 10e.

FIG. 10g shows the table 600 of per buffer controls upon completion of a final sub-operation to produce a final block (corresponding to a completed block in this case). In FIG. 10g, Buffer2 now stores valid data for a consumer of intermediate blocks (C0 (intermed) and a consumer of final blocks (C1) and thus has an "Valid C0 (intermed)" value of 1 and a "Valid C1" value of 1. In this case, Buffer2 stores the final block of the final sub-operation of the production operation. The remaining control data remains the same as in FIG. 10f.

Programs and Systems for Implementing Examples Herein

At least some aspects of the examples described herein comprise computer processes performed in processing systems or processors. However, in some examples, the disclosure also extends to computer programs, particularly computer programs on or in an apparatus, adapted for putting the disclosure into practice. The program may be in the form of non-transitory source code, object code, a code intermediate source and object code such as in partially compiled form, or in any other non-transitory form suitable for use in the implementation of processes according to the disclosure. The apparatus may be any entity or device capable of carrying the program. For example, the apparatus may comprise a storage medium, such as a solid-state drive (SSD) or other semiconductor-based RAM; a ROM, for example, a CD ROM or a semiconductor ROM; a magnetic recording medium, for example, a floppy disk or hard disk; optical memory devices in general; etc.

Concepts described herein may be embodied in a system comprising at least one packaged chip. In some cases, the processor described earlier may be implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

As shown in FIG. 9, one or more packaged chips 180, with the processor described above implemented on one chip or distributed over two or more of the chips, are manufactured by a semiconductor chip manufacturer. In some examples, the chip product 180 made by the semiconductor chip manufacturer may be provided as a semiconductor package which comprises a protective casing (e.g. made of metal, plastic, glass or ceramic) containing the semiconductor devices implementing the processor described above and/or connectors, such as lands, balls or pins, for connecting the semiconductor devices to an external environment. Where more than one chip 180 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 180 are assembled on a board 182 together with at least one system component 184 to provide a system 186. For example, the board may comprise a printed circuit board. The board substrate may be made of any of a variety of materials, e.g. plastic, glass, ceramic, or a flexible substrate material such as paper, plastic or textile material. The at least one system component 184 comprise one or more external components which are not part of the one or more packaged chip(s) 180. For example, the at least one system component 184 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 187 is manufactured comprising the system 186 (including the board 182, the one or more chips 180 and the at least one system component 184) and one or more product components 188. The product components 188 comprise one or more further components which are not part of the system 187. As a non-exhaustive list of examples, the one or more product components 188 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 187 and one or more product components 188 may be assembled on to a further board 189.

The board 182 or the further board 189 may be provided on or within a device housing or other structural support (e.g. a frame or blade) to provide a product which can be handled by a user and/or is intended for operational use by a person or company.

The system 186 or the chip-containing product 187 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Further Examples

In the preceding description, for purposes of explanation, numerous specific details of certain examples are set forth. Reference in the specification to "an example" or similar language means that a particular feature, structure, or characteristic described in connection with the example is included in at least that one example, but not necessarily in other examples.

The above examples are to be understood as illustrative examples of the disclosure. Further examples are envisaged.

In examples above, the handling unit 720 performs the allocation of storage elements to logical storage locations and the scheduling of operations for execution by the neural engine 700. However, in other examples, a different component of a processor than the handling unit 720 may perform at least one of these aspects. For example, at least one of these aspects may be performed by the command and control module 710, alone or in combination with the handling unit 720.

In examples above, a linked list 300, 400, 500 is generated based on an order associated with blocks of a given production operation. In some cases, a different respective linked list may be generated for each of a plurality of production operations, each of which may generate a respective output corresponding to a respective sub-pipe. In such cases, each of the sub-pipes may be dynamically allocated to map to the same underlying region of the storage, e.g. by the handling unit 720.

It is to be understood that any feature described in relation to any one example may be used alone, or in combination with other features described, and may also be used in combination with one or more features of any other of the example, or any combination of any other of the examples. Furthermore, equivalents and modifications not described above may also be employed without departing from the scope of the disclosure, which is defined in the accompanying claims.

Further examples are set out in the following numbered clauses:

1. A processor comprising:
   storage;
   execution circuitry; and
   a handling unit configured to:
      obtain task data that describes a task to be executed, the task comprising a plurality of operations representable as a directed graph of operations, the plurality of operations comprising:
         a set of production operations comprising generating a set of blocks of data values, the set of blocks comprising an intermediate block of intermediate data values generated by a production operation of the set of production operations in determining a final block of final data values based on the intermediate block; and
         a set of consumption operations, each comprising reading of at least one of the set of blocks; and
      allocate respective physical storage locations of the storage for storing respective blocks of the set of blocks;
      generate a set of location data indicative of the respective physical storage locations; and
      instruct execution of at least part of a consumption operation of the set of consumption operations comprising reading of the intermediate block, comprising:
         traversing the set of location data to obtain location data of the set of location data indicative of a physical storage location of the physical storage locations for storing the intermediate block;
         generating execution instructions to instruct the execution circuitry to execute the at least part of the consumption operation to read the intermediate block from the physical storage location, the execution instructions comprising the location data; and
         sending the execution instructions to the execution circuitry.
2. The processor of clause 1, wherein the handling unit is configured to:
   generate a data structure for the set of location data; and
   arrange the set of location data within the data structure to indicate an order of respective blocks within the set of blocks.
3. The processor of clause 2, wherein the data structure comprises:
   final entries storing respective final location data of the set of location data for a respective final block of final data values; and
   intermediate entries storing respective intermediate location data of the set of location data for a respective intermediate block of intermediate data values; and
   for a given consumption operation comprising reading at least one of the final blocks without reading the intermediate blocks, traversing the set of location data comprises:
   traversing through the data structure via the final entries by skipping respective intermediate entries.
4. The processor of clause 2 or clause 3, wherein the data structure comprises pointers for respective physical storage locations such that a given pointer for a given physical storage location for storing a given block points to a successive physical storage location for storing a successive block, successive to the given block according to the order.
5. The processor of any one of clauses 2 to 4, wherein the data structure comprises a linked list, and traversing the set of location data comprises traversing the linked list.
6. The processor of clause 5, wherein the linked list is a skipping linked list having a first traversal path for traversing therethrough and a second traversal path for traversing therethrough, wherein the second traversal path comprises a subset of entries along the first traversal path.
7. The processor of clause 6, wherein the blocks comprise a plurality of intermediate blocks of intermediate data values and a plurality of final blocks of final data values, the plurality of intermediate blocks comprising the intermediate block and the plurality of final blocks comprising the final block, the order is a first order, and the handling unit is configured to arrange the set of location data within the skipping linked list such that:
   the entries along the first traversal path comprise intermediate entries for respective intermediate blocks and final entries for respective final blocks, arranged to indicate the first order; and
   the subset of entries comprise the final entries, arranged to indicate a second order of the plurality of final blocks within the set of blocks.
8. The processor of clause 7, wherein, in response to the task data being indicative that the consumption operation comprises reading of the intermediate block, traversing the set of location data comprises traversing the skipping linked list along the first traversal path.
9. The processor of clause 7 or clause 8, wherein, in response to the task data being indicative that the set of consumption operations comprises a further consumption operation comprising reading a given final block of the plurality of final blocks without reading the plurality of intermediate blocks, the handling unit is configured to:
   traverse the skipping linked list along the second traversal path to obtain further location data of the set of location data indicative of a further physical storage location of the physical storage locations for storing the given final block;
   generate further execution instructions to instruct the execution circuitry to execute the further consumption operation to read the given final block from the further physical storage location, the further execution instructions comprising the further location data; and send the further execution instructions to the execution circuitry.

10. The processor of clause 5, wherein the blocks comprise a plurality of intermediate blocks of intermediate data values and a plurality of final blocks of final data values, the plurality of intermediate blocks comprising the intermediate block and the plurality of final blocks comprising the final block, and wherein, in response to the task data being indicative that the set of consumption operations comprises a further consumption operation comprising reading a given final block of the plurality of final blocks without reading the plurality of intermediate blocks, the handling unit is configured to:
traverse the linked list; and
in response to traversing an entry of the linked list corresponding to the given final block: obtain further location data of the set of location data indicative of a further physical storage location of the physical storage locations for storing the given final block;
generate further execution instructions to instruct the execution circuitry to execute the further consumption operation to read the given final block from the further physical storage location, the further execution instructions comprising the further location data; and
send the further execution instructions to the execution circuitry.

11. The processor of clause 10, wherein the entry is a final entry and the linked list comprises an intermediate entry corresponding to the intermediate block and, in response to traversing the intermediate entry, the handling unit is configured to suppress reading of the intermediate block by the execution circuitry in executing the further consumption operation.

12. The processor of clause 11, wherein the handling unit is configured to suppress sending of intermediate further execution instructions instructing reading of the intermediate block to the execution circuitry, to suppress the reading of the intermediate block by the execution circuitry.

13. The processor of any one of clauses 2 to 12, wherein two of the physical storage locations, to which successive blocks are to be written according to the order, are non-contiguous with each other within the storage.

14. The processor of any one of clauses 1 to 13, wherein the production operation comprises generating a plurality of intermediate blocks of intermediate data values, each generated by a respective sub-operation of the production operation, the plurality of intermediate blocks comprising the intermediate block, wherein each sub-operation corresponds to a respective iteration of a loop over a dimension of a multi-dimensional nested loop, the intermediate block is an $N_{th}$ block generated within an $N_{th}$ iteration of the loop, and the at least part of the consumption operation comprises reading of an $(N-k)_{th}$ block generated within an $(N-k)_{th}$ iteration of the loop, where N is an integer with a value greater than k, and k is an integer with a value greater than or equal to 1 and less than N.

15. The processor of clause 14, wherein the dimension is an innermost dimension of the multi-dimensional nested loop.

16. The processor of clause 14, wherein the loop is a multi-dimensional loop, the production operation comprises generating at least one further block of further data values between each pair of intermediate blocks, the handling unit is configured to obtain, from the task data, count data indicative of a number of further blocks of the at least one further block between each pair of intermediate blocks, and the handling unit is configured to traverse the set of location data at least partly based on the count data to obtain the location data and $(N-k)_{th}$ location data indicative of a physical storage location for storing the $(N-k)_{th}$ block.

17. The processor of clause 14, wherein the dimension is a first dimension, the loop is a multi-dimensional loop having a first loop corresponding to the first dimension, the multi-dimensional nested loop comprises at least one further dimension, and the production operation comprises at least one iteration of a respective loop of the multi-dimensional loop over each of the at least one further dimension between consecutive iterations of the first loop over the first dimension to generate a respective further block for each of the at least one iteration between each pair of intermediate blocks.

18. The processor of clause 17, wherein the directed graph is indicative of a number of dimensions of the multi-dimensional nested loop inwards of the first dimension, and a number of iterations of a respective loop over each of the dimensions of the multi-dimensional nested loop inwards of the first dimension, and the handling unit is configured to:
generate, based on the directed graph, count data indicative of a number of further blocks of the at least one further block generated between each pair of intermediate blocks in executing the production operation; and
traverse the set of location data at least partly based on the count data to obtain the location data and $(N-k)_{th}$ location data indicative of a physical storage location for storing the $(N-k)_{th}$ block.

19. The processor of any one of clauses 1 to 18, wherein each of the blocks corresponds to a respective portion of a multi-dimensional tensor.

20. The processor of any one of clauses 1 to 19, wherein the plurality of operations in the directed graph of operations are connected by connections, and the handling unit is configured to:
map the connections to respective logical storage locations, corresponding to the respective physical storage locations; and
instruct the execution circuitry to read from a given physical storage location of the physical storage locations at different rates in executing different operations of the task.

21. The processor of any one of clauses 1 to 20, wherein the task data is indicative that an initial sub-operation of the consumption operation comprises reading a predefined block of data values prior to reading of the intermediate block, and the handling unit is configured to:
allocate an initialization physical storage location of the storage for storing the predefined block;
generate initialization location data indicative of the initialization physical storage location; and
include the initialization location data within the set of location data.

22. The processor of clause 21, wherein the data values of the predefined block comprise predefined data values.

23. The processor of clause 21 or clause 22, wherein the predefined block comprises at least one of:

a further block of further data values generated by a further production operation of the set of production operations; and a prior block of prior data values generated by a prior operation of a prior task executed by the execution circuitry.

24. The processor of any one of clauses 21 to 23, wherein the handling unit is configured to instruct execution of the initial sub-operation of the consumption operation, comprising:

traversing the set of location data to obtain the initialization location data indicative of the initialization physical storage location for storing the predefined block;

generating initial execution instructions to instruct the execution circuitry to execute the initial sub-operation to read the predefined block from the initialization physical storage location, the initial execution instructions comprising the initialization location data; and sending the initialization execution instructions to the execution circuitry.

25. The processor of any one of clauses 1 to 24, wherein the execution circuitry comprises first execution circuitry configured to implement a first execution unit and second execution circuitry configured to execute a second execution unit and the handling unit is configured to allocate the first execution unit for execution of the production operation and the second execution element for execution of the consumption operation.

26. A system comprising:
the processor of any one of clauses 1 to 25, implemented in at least one packaged chip;
at least one system component; and
a board,
wherein the at least one packaged chip and the at least one system component are assembled on the board.

27. A chip-containing product comprising the system of clause 26, wherein the system is assembled on a further board with at least one other product component.

28. A non-transitory computer-readable medium having stored thereon computer-readable code for fabrication of the processor of any one of clauses 1 to 25.

What is claimed is:

1. A processor comprising:
storage;
execution circuitry; and
a handling unit configured to:
obtain task data that describes a task to be executed, the task comprising a plurality of operations representable as a directed graph of operations, the plurality of operations comprising:
a set of production operations comprising generating a set of blocks of data values, the set of blocks comprising an intermediate block of intermediate data values generated by a production operation of the set of production operations in determining a final block of final data values based on the intermediate block; and
a set of consumption operations, each comprising reading of at least one of the set of blocks; and
allocate respective physical storage locations of the storage for storing respective blocks of the set of blocks;
generate a set of location data indicative of the respective physical storage locations; and
instruct execution of at least part of a consumption operation of the set of consumption operations comprising reading of the intermediate block, comprising:
traversing the set of location data to obtain location data of the set of location data indicative of a physical storage location of the physical storage locations for storing the intermediate block;
generating execution instructions to instruct the execution circuitry to execute the at least part of the consumption operation to read the intermediate block from the physical storage location, the execution instructions comprising the location data; and
sending the execution instructions to the execution circuitry.

2. The processor of claim 1, wherein the handling unit is configured to:
generate a data structure for the set of location data; and
arrange the set of location data within the data structure to indicate an order of respective blocks within the set of blocks.

3. The processor of claim 2, wherein the data structure comprises:
final entries storing respective final location data of the set of location data for a respective final block of final data values; and
intermediate entries storing respective intermediate location data of the set of location data for a respective intermediate block of intermediate data values; and
for a given consumption operation comprising reading at least one of the final blocks without reading the intermediate blocks, traversing the set of location data comprises:
traversing through the data structure via the final entries by skipping respective intermediate entries.

4. The processor of claim 2, wherein the data structure comprises pointers for respective physical storage locations such that a given pointer for a given physical storage location for storing a given block points to a successive physical storage location for storing a successive block, successive to the given block according to the order.

5. The processor of claim 2, wherein the data structure comprises a skipping linked list having a first traversal path for traversing therethrough and a second traversal path for traversing therethrough, wherein the second traversal path comprises a subset of entries along the first traversal path, and traversing the set of location data comprises traversing the skipping linked list.

6. The processor of claim 5, wherein the blocks comprise a plurality of intermediate blocks of intermediate data values and a plurality of final blocks of final data values, the plurality of intermediate blocks comprising the intermediate block and the plurality of final blocks comprising the final block, the order is a first order, and the handling unit is configured to arrange the set of location data within the skipping linked list such that:
the entries along the first traversal path comprise intermediate entries for respective intermediate blocks and final entries for respective final blocks, arranged to indicate the first order; and
the subset of entries comprise the final entries, arranged to indicate a second order of the plurality of final blocks within the set of blocks.

7. The processor of claim 6, wherein at least one of:
in response to the task data being indicative that the consumption operation comprises reading of the intermediate block, traversing the set of location data comprises traversing the skipping linked list along the first traversal path;

and:

in response to the task data being indicative that the set of consumption operations comprises a further consumption operation comprising reading a given final block of the plurality of final blocks without reading the plurality of intermediate blocks, the handling unit is configured to:

traverse the skipping linked list along the second traversal path to obtain further location data of the set of location data indicative of a further physical storage location of the physical storage locations for storing the given final block;

generate further execution instructions to instruct the execution circuitry to execute the further consumption operation to read the given final block from the further physical storage location, the further execution instructions comprising the further location data; and send the further execution instructions to the execution circuitry.

8. The processor of claim 2, wherein the data structure comprises a linked list, the blocks comprise a plurality of intermediate blocks of intermediate data values and a plurality of final blocks of final data values, the plurality of intermediate blocks comprising the intermediate block and the plurality of final blocks comprising the final block, and wherein, in response to the task data being indicative that the set of consumption operations comprises a further consumption operation comprising reading a given final block of the plurality of final blocks without reading the plurality of intermediate blocks, the handling unit is configured to:

traverse the linked list to traverse the set of location data; and in response to traversing an entry of the linked list corresponding to the given final block:

obtain further location data of the set of location data indicative of a further physical storage location of the physical storage locations for storing the given final block;

generate further execution instructions to instruct the execution circuitry to execute the further consumption operation to read the given final block from the further physical storage location, the further execution instructions comprising the further location data; and send the further execution instructions to the execution circuitry.

9. The processor of claim 8, wherein the entry is a final entry and the linked list comprises an intermediate entry corresponding to the intermediate block and, in response to traversing the intermediate entry, the handling unit is configured to suppress reading of the intermediate block by the execution circuitry in executing the further consumption operation.

10. The processor of claim 9, wherein the handling unit is configured to suppress sending of intermediate further execution instructions instructing reading of the intermediate block to the execution circuitry, to suppress the reading of the intermediate block by the execution circuitry.

11. The processor of claim 1, wherein the production operation comprises generating a plurality of intermediate blocks of intermediate data values, each generated by a respective sub-operation of the production operation, the plurality of intermediate blocks comprising the intermediate block, wherein each sub-operation corresponds to a respective iteration of a loop over a dimension of a multi-dimensional nested loop, the intermediate block is an $N_{th}$ block generated within an $N_{th}$ iteration of the loop, and the at least part of the consumption operation comprises reading of an $(N-k)_{th}$ block generated within an $(N-k)_{th}$ iteration of the loop, where N is an integer with a value greater than k, and k is an integer with a value greater than or equal to 1 and less than N.

12. The processor of claim 11, wherein the dimension is an innermost dimension of the multi-dimensional nested loop.

13. The processor of claim 11, wherein the loop is a multi-dimensional loop, the production operation comprises generating at least one further block of further data values between each pair of intermediate blocks, the handling unit is configured to obtain, from the task data, count data indicative of a number of further blocks of the at least one further block between each pair of intermediate blocks, and the handling unit is configured to traverse the set of location data at least partly based on the count data to obtain the location data and $(N-k)_{th}$ location data indicative of a physical storage location for storing the $(N-k)_{th}$ block.

14. The processor of claim 11, wherein the dimension is a first dimension, the loop is a multi-dimensional loop having a first loop corresponding to the first dimension, the multi-dimensional nested loop comprises at least one further dimension, and the production operation comprises at least one iteration of a respective loop of the multi-dimensional loop over each of the at least one further dimension between consecutive iterations of the first loop over the first dimension to generate a respective further block for each of the at least one iteration between each pair of intermediate blocks.

15. The processor of claim 14, wherein the directed graph is indicative of a number of dimensions of the multi-dimensional nested loop inwards of the first dimension, and a number of iterations of a respective loop over each of the dimensions of the multi-dimensional nested loop inwards of the first dimension, and the handling unit is configured to:

generate, based on the directed graph, count data indicative of a number of further blocks of the at least one further block generated between each pair of intermediate blocks in executing the production operation; and traverse the set of location data at least partly based on the count data to obtain the location data and $(N-k)_{th}$ location data indicative of a physical storage location for storing the $(N-k)_{th}$ block.

16. The processor of claim 1, wherein the task data is indicative that an initial sub-operation of the consumption operation comprises reading a predefined block of data values prior to reading of the intermediate block, and the handling unit is configured to:

allocate an initialization physical storage location of the storage for storing the predefined block;

generate initialization location data indicative of the initialization physical storage location; and include the initialization location data within the set of location data.

17. The processor of claim 16, wherein the predefined block comprises at least one of:

predefined data values;

a further block of further data values generated by a further production operation of the set of production operations; and a prior block of prior data values generated by a prior operation of a prior task executed by the execution circuitry.

18. A system comprising:
the processor of claim 1, implemented in at least one packaged chip;
at least one system component; and
a board,
wherein the at least one packaged chip and the at least one system component are assembled on the board.

19. A chip-containing product comprising the system of claim 18, wherein the system is assembled on a further board with at least one other product component.

20. A non-transitory computer-readable medium having stored thereon computer-readable code for fabrication of the processor of claim 1.

* * * * *